(12) United States Patent
Bone et al.

(10) Patent No.: US 10,606,043 B2
(45) Date of Patent: Mar. 31, 2020

(54) OPTICAL IMAGING LENS

(71) Applicant: Genius Electronic Optical Co., Ltd., Taichung (TW)

(72) Inventors: Matthew Bone, Fujian (CN); Huabin Liao, Fujian (CN); Tianfang Gao, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 253 days.

(21) Appl. No.: 15/630,957

(22) Filed: Jun. 23, 2017

(65) Prior Publication Data
US 2018/0356616 A1 Dec. 13, 2018

(30) Foreign Application Priority Data
Jun. 12, 2017 (CN) .......................... 2017 1 0437167

(51) Int. Cl.
| G02B 9/62 | (2006.01) |
| G02B 13/18 | (2006.01) |
| G02B 13/00 | (2006.01) |
| G02B 13/04 | (2006.01) |
| G02B 9/64 | (2006.01) |
| H04N 5/225 | (2006.01) |

(52) U.S. Cl.
CPC .............. *G02B 13/18* (2013.01); *G02B 9/62* (2013.01); *G02B 9/64* (2013.01); *G02B 13/0045* (2013.01); *G02B 13/04* (2013.01); *G02B 13/001* (2013.01); *H04N 5/2254* (2013.01)

(58) Field of Classification Search
CPC .......... G02B 13/18; G02B 9/64; G02B 13/04; G02B 9/62; G02B 13/0045; G02B 13/001
See application file for complete search history.

(56) References Cited

U.S. PATENT DOCUMENTS

| 2012/0026285 A1 | 2/2012 | Yoshida et al. |
| 2014/0126070 A1 | 5/2014 | Ning |

(Continued)

FOREIGN PATENT DOCUMENTS

| CN | 104007535 | 10/2016 |
| JP | 5369867 | 12/2013 |
| TW | I528049 | 4/2016 |

(Continued)

OTHER PUBLICATIONS

Office Action of Taiwan Counterpart Application, dated Jun. 29, 2018, pp. 1-12.

(Continued)

*Primary Examiner* — Joseph P Martinez
(74) *Attorney, Agent, or Firm* — JCIPRNET

(57) ABSTRACT

An optical imaging lens includes first, second, third, fourth, fifth and sixth lens elements arranged in sequence from an object side to an image side along an optical axis. The third lens element is a first lens having a refracting power and sequentially counted from an aperture stop toward the object side. The fourth lens element is a first lens sequentially counted having a refracting power and from the aperture stop toward the image side. At least one of the third lens element and the fourth lens element has a positive refracting power and is a glass material. The optical imaging lens is complied with: $2.4 \leq (G1+G2)/T6$.

19 Claims, 33 Drawing Sheets

(56) References Cited

U.S. PATENT DOCUMENTS

2017/0059820 A1  3/2017  Tang et al.
2017/0059821 A1* 3/2017  Liu .................... G02B 13/0045

FOREIGN PATENT DOCUMENTS

| TW | M537661 | 3/2017 |
| TW | I612328 | 1/2018 |
| TW | 201807449 | 3/2018 |

OTHER PUBLICATIONS

"Office Action of Taiwan Counterpart Application", dated Aug. 27, 2018, p. 1-p. 6.
"Search Report of Europe Counterpart Application", dated Sep. 28, 2018, p. 1-p. 10.

* cited by examiner

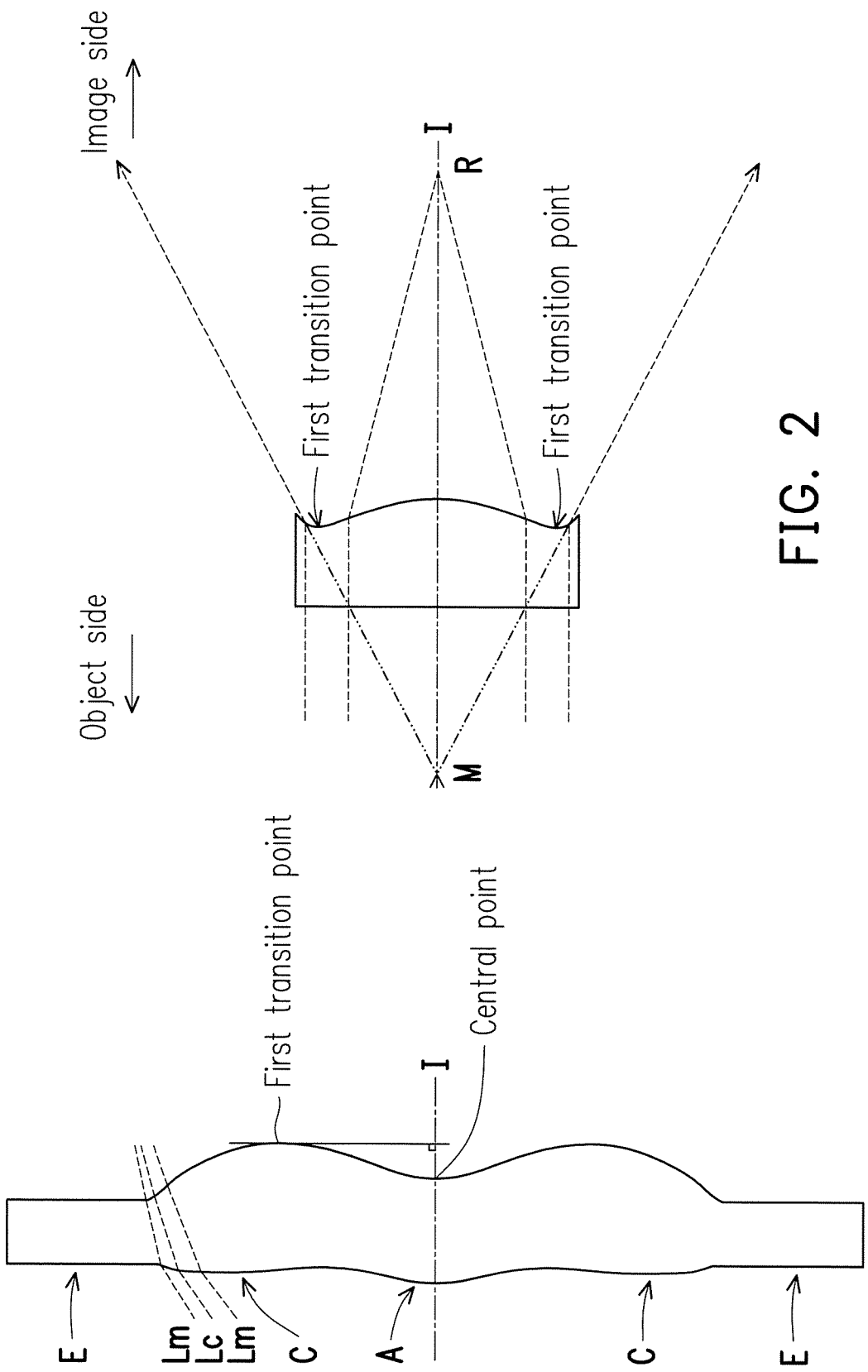

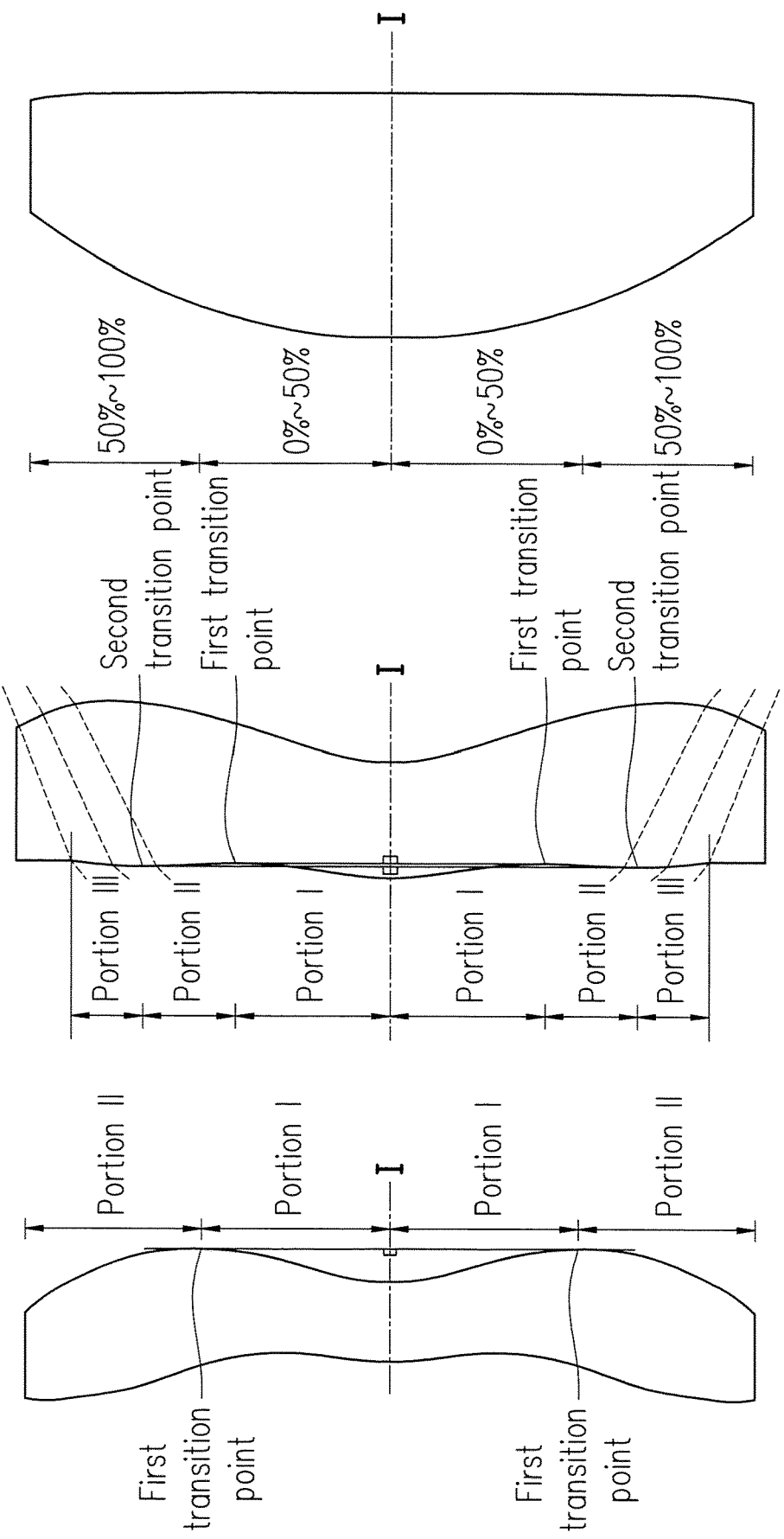

- - · - 470nm
—— 555nm
- - - - 650nm

Longitudinal
spherical aberration
Field of view

Field curvature
(sagittal direction)
Half field of
view (°)

Field curvature
(tangential direction)
Half field of
view (°)

Distortion
Half field of
view (°)

| First embodiment ||||||
|---|---|---|---|---|---|
| EFL= 2.054 mm, HFOV= 59.854 Degree, TTL= 18.000 mm, Fno= 2.482 ||||||
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 18.742 | 1.000 | 1.603 | 65.444 | -14.002 |
| | Image-side surface 12 | 5.715 | 1.968 | | | |
| Second lens element 2 | Object-side surface 21 | 895.933 | 1.000 | 1.545 | 55.987 | -4.626 |
| | Image-side surface 22 | 2.519 | 2.537 | | | |
| Third lens element 3 | Object-side surface 31 | -17.818 | 1.174 | 1.661 | 20.401 | 10.834 |
| | Image-side surface 32 | -5.273 | 1.611 | | | |
| Aperture stop 0 | | Infinity | 0.200 | | | |
| Fourth lens element 4 | Object-side surface 41 | Infinity | 1.300 | 1.639 | 55.472 | 7.188 |
| | Image-side surface 42 | -4.605 | 0.288 | | | |
| Fifth lens element 5 | Object-side surface 51 | 19.734 | 1.130 | 1.545 | 55.987 | 17.673 |
| | Image-side surface 52 | -18.519 | 2.208 | | | |
| Sixth lens element 6 | Object-side surface 61 | 7.273 | 1.685 | 1.545 | 55.987 | 13.225 |
| | Image-side surface 62 | -1000.000 | 0.600 | | | |
| Light filter 9 | Object-side surface 91 | Infinity | 0.210 | 1.517 | 64.167 | |
| | Image-side surface 92 | Infinity | 1.090 | | | |
| | Image plane 100 | Infinity | | | | |

FIG. 8

| Surface | K | a2 | a4 | a6 | a8 |
|---|---|---|---|---|---|
| 21 | 0.000000E+00 | 0.000000E+00 | 1.176339E-02 | -1.617926E-03 | 1.129461E-04 |
| 22 | 0.000000E+00 | 0.000000E+00 | 6.344383E-03 | -1.075113E-03 | -5.262451E-04 |
| 31 | 0.000000E+00 | 0.000000E+00 | -1.324877E-02 | 4.400296E-04 | 3.401517E-04 |
| 32 | 0.000000E+00 | 0.000000E+00 | -5.562699E-03 | 1.870974E-03 | -2.694455E-04 |
| 51 | 0.000000E+00 | 0.000000E+00 | -1.259601E-03 | 3.011302E-03 | -4.371063E-04 |
| 52 | 0.000000E+00 | 0.000000E+00 | -9.346812E-04 | 2.414479E-03 | 4.339858E-05 |
| 61 | -4.873110E+00 | 0.000000E+00 | -4.637244E-03 | 3.200816E-04 | 2.286396E-05 |
| 62 | 0.000000E+00 | 0.000000E+00 | 9.663569E-03 | -1.895251E-03 | 1.324467E-04 |
| Surface | a10 | a12 | a14 | a16 | a18 |
| 21 | -3.774422E-06 | 5.035710E-08 | 0.000000E+00 | 0.000000E+00 | 0.000000E+00 |
| 22 | 5.735485E-05 | 0.000000E+00 | 0.000000E+00 | 0.000000E+00 | 0.000000E+00 |
| 31 | -5.062842E-05 | 0.000000E+00 | 0.000000E+00 | 0.000000E+00 | 0.000000E+00 |
| 32 | 9.462257E-06 | 0.000000E+00 | 0.000000E+00 | 0.000000E+00 | 0.000000E+00 |
| 51 | 1.463420E-05 | 0.000000E+00 | 0.000000E+00 | 0.000000E+00 | 0.000000E+00 |
| 52 | -2.882225E-05 | 0.000000E+00 | 0.000000E+00 | 0.000000E+00 | 0.000000E+00 |
| 61 | -2.040119E-06 | 0.000000E+00 | 0.000000E+00 | 0.000000E+00 | 0.000000E+00 |
| 62 | -3.998156E-06 | 2.814826E-09 | 0.000000E+00 | 0.000000E+00 | 0.000000E+00 |
| Surface | a20 | | | | |
| 21 | 0.000000E+00 | | | | |
| 22 | 0.000000E+00 | | | | |
| 31 | 0.000000E+00 | | | | |
| 32 | 0.000000E+00 | | | | |
| 51 | 0.000000E+00 | | | | |
| 52 | 0.000000E+00 | | | | |
| 61 | 0.000000E+00 | | | | |
| 62 | 0.000000E+00 | | | | |

FIG. 9

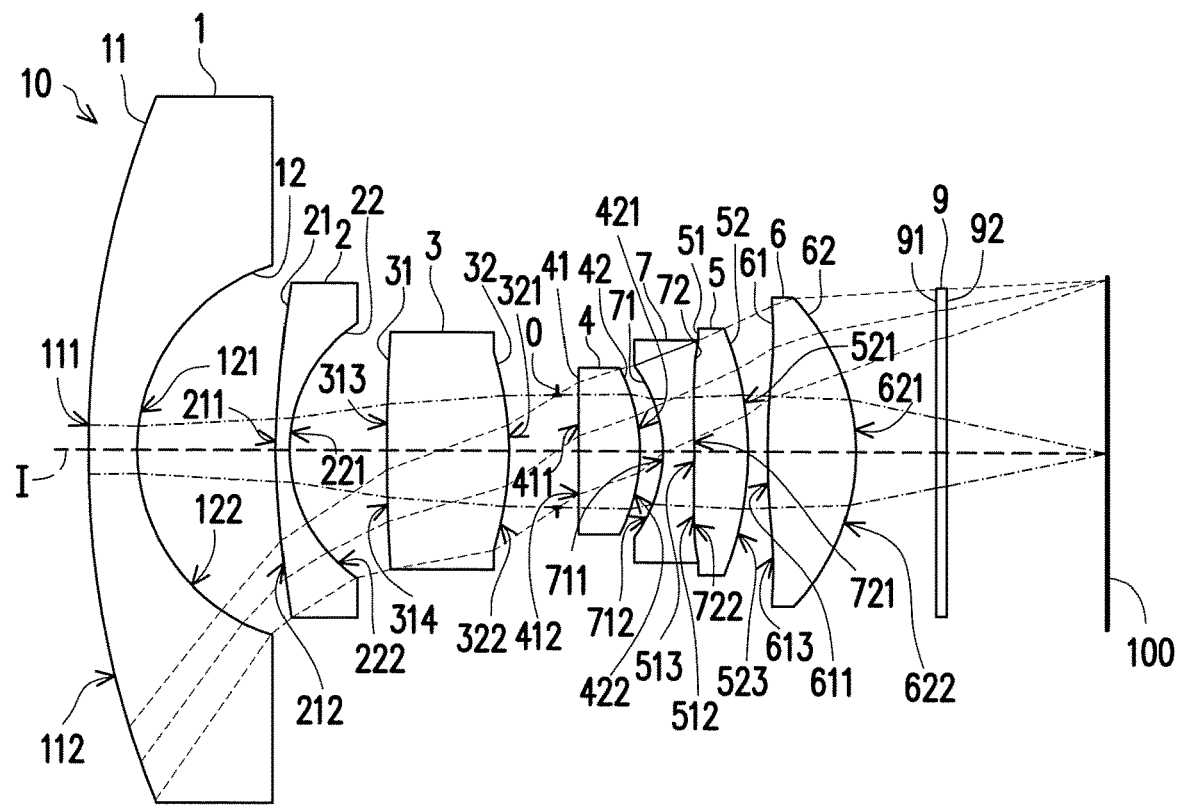
FIG. 10
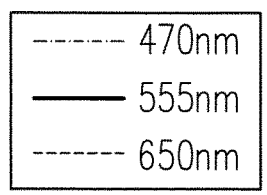
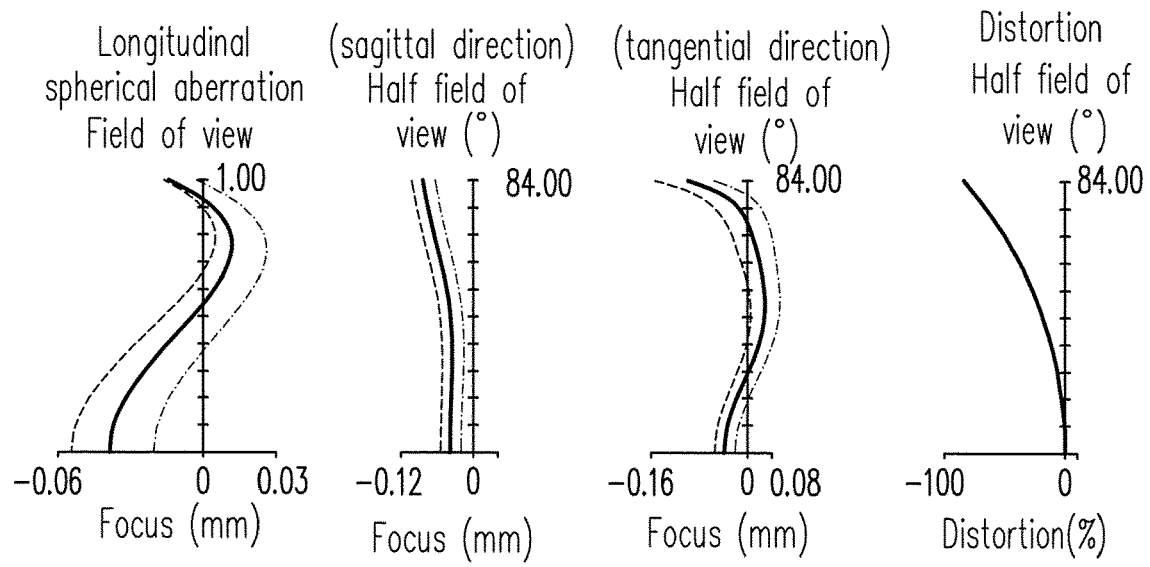
FIG. 11A   FIG. 11B  FIG. 11C  FIG. 11D

| Second embodiment ||||||
| --- |
| EFL= 2.360 mm, HFOV=63.818 Degree, TTL= 20.644 mm, Fno= 2.450 ||||||
| Element | Surface | Radius of curvature(mm) | Thickness (mm) | Refractive index | Abbe number | Focal length(mm) |
| --- | --- | --- | --- | --- | --- | --- |
| Object | | Infinity | Infinity | | | |
| First lens element 1 | Object-side surface 11 | 19.457 | 1.000 | 1.603 | 65.444 | -8.301 |
| | Image-side surface 12 | 3.913 | 2.798 | | | |
| Second lens element 2 | Object-side surface 21 | 14.932 | 0.280 | 1.545 | 55.987 | -7.399 |
| | Image-side surface 22 | 3.160 | 1.963 | | | |
| Third lens element 3 | Object-side surface 31 | 34.735 | 2.483 | 1.661 | 20.401 | 8.124 |
| | Image-side surface 32 | -6.229 | 0.993 | | | |
| Aperture stop 0 | | Infinity | 0.408 | | | |
| Fourth lens element 4 | Object-side surface 41 | Infinity | 1.245 | 1.639 | 55.472 | 5.550 |
| | Image-side surface 42 | -3.556 | 0.473 | | | |
| Seventh lens element 7 | Object-side surface 71 | -2.583 | 0.625 | 1.661 | 20.401 | -3.899 |
| fifth lens element 5 | Object-side surface 51 | -88.397 | 1.096 | 1.545 | 55.987 | 10.573 |
| | Image-side surface 52 | -5.854 | 0.392 | | | |
| Sixth lens element 6 | Object-side surface 61 | 13.731 | 1.789 | 1.545 | 55.987 | 6.306 |
| | Image-side surface 62 | -4.387 | 1.631 | | | |
| Light filter 9 | Object-side surface 91 | Infinity | 0.210 | 1.517 | 64.167 | |
| | Image-side surface 92 | Infinity | 3.258 | | | |
| | Image plane 100 | Infinity | | | | |

FIG. 12

| Surface | K | a2 | a4 | a6 | a8 |
|---|---|---|---|---|---|
| 21 | 0.000000E+00 | 0.000000E+00 | -5.428879E-04 | 0.000000E+00 | 0.000000E+00 |
| 22 | 0.000000E+00 | 0.000000E+00 | 6.141529E-04 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 1.650961E-03 | -2.182533E-04 | 1.712267E-05 |
| 71 | 0.000000E+00 | 0.000000E+00 | 6.173675E-03 | 9.539970E-04 | 0.000000E+00 |
| 51 | 0.000000E+00 | 0.000000E+00 | 4.552296E-03 | 0.000000E+00 | 0.000000E+00 |
| 52 | 0.000000E+00 | 0.000000E+00 | 2.836700E-03 | -1.392088E-04 | 0.000000E+00 |
| 61 | 8.740116E+00 | 0.000000E+00 | -2.540962E-03 | -1.159209E-04 | 0.000000E+00 |
| 62 | 0.000000E+00 | 0.000000E+00 | 1.150794E-03 | -5.456845E-05 | 0.000000E+00 |
| Surface | a10 | a12 | a14 | a16 | a18 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| Surface | a20 | | | | |
| 21 | 0.000000E+00 | | | | |
| 22 | 0.000000E+00 | | | | |
| 31 | 0.000000E+00 | | | | |
| 32 | 0.000000E+00 | | | | |
| 71 | 0.000000E+00 | | | | |
| 51 | 0.000000E+00 | | | | |
| 52 | 0.000000E+00 | | | | |
| 61 | 0.000000E+00 | | | | |
| 62 | 0.000000E+00 | | | | |

FIG. 13

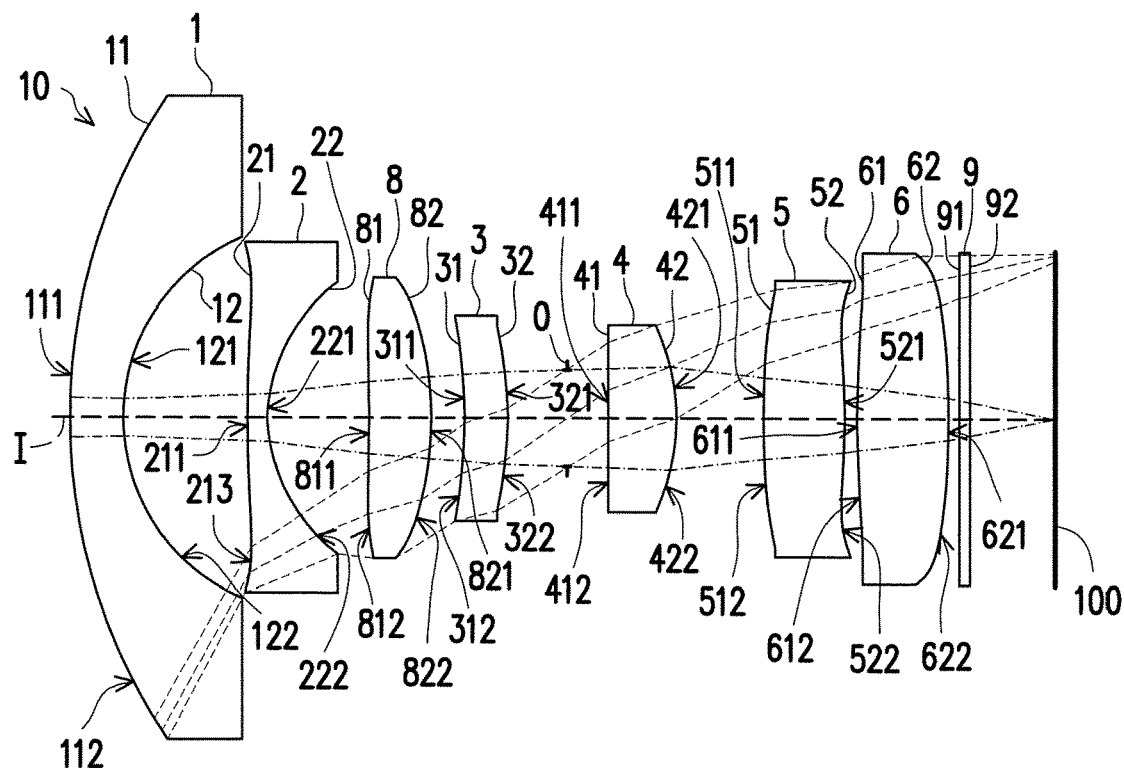
FIG. 14
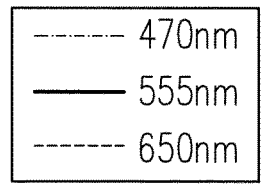
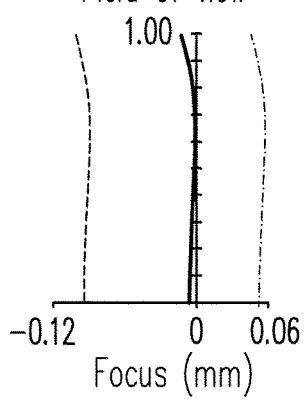
FIG. 15A
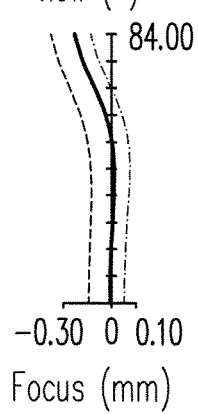
FIG. 15B
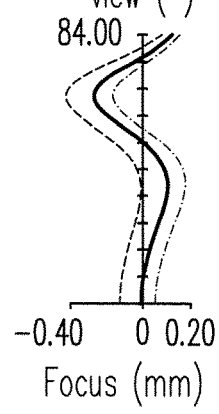
FIG. 15C
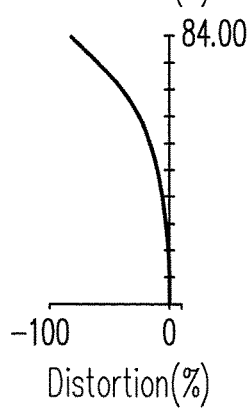
FIG. 15D

| Third embodiment | | | | | | |
|---|---|---|---|---|---|---|
| EFL=1.857 mm, HFOV= 51.467 Degree, TTL= 18.625 mm, Fno= 2.439 | | | | | | |
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 11.091 | 1.000 | 1.603 | 65.444 | -9.845 |
| | Image-side surface 12 | 3.742 | 2.355 | | | |
| Second lens element 2 | Object-side surface 21 | 19.301 | 0.367 | 1.545 | 55.987 | -5.967 |
| | Image-side surface 22 | 2.770 | 1.926 | | | |
| Eighth lens element 8 | Object-side surface 81 | -30.955 | 1.172 | 1.545 | 55.987 | 15.794 |
| | Image-side surface 82 | -6.837 | 0.637 | | | |
| Third lens element 3 | Object-side surface 31 | -9.764 | 0.824 | 1.661 | 20.401 | 21.669 |
| | Image-side surface 32 | -6.022 | 1.102 | | | |
| Aperture stop 0 | | Infinity | 0.780 | | | |
| Fourth lens element 4 | Object-side surface 41 | Infinity | 1.293 | 1.639 | 55.472 | 6.744 |
| | Image-side surface 42 | -4.321 | 1.665 | | | |
| Fifth lens element 5 | Object-side surface 51 | 59.961 | 1.516 | 1.661 | 20.401 | 14.153 |
| | Image-side surface 52 | -11.078 | 0.235 | | | |
| Sixth lens element 6 | Object-side surface 61 | 14.570 | 1.727 | 1.545 | 55.987 | 12.698 |
| | Image-side surface 62 | -12.686 | 0.200 | | | |
| Light filter 9 | Object-side surface 91 | Infinity | 0.210 | 1.517 | 64.167 | |
| | Image-side surface 92 | Infinity | 1.615 | | | |
| | Image plane 100 | Infinity | | | | |

FIG. 16

| Surface | K | a2 | a4 | a6 | a8 |
|---|---|---|---|---|---|
| 21 | 0.000000E+00 | 0.000000E+00 | -2.202596E-03 | -2.619755E-05 | -1.722285E-06 |
| 22 | 0.000000E+00 | 0.000000E+00 | -4.808724E-03 | -5.529481E-04 | -2.676232E-05 |
| 81 | 0.000000E+00 | 0.000000E+00 | 3.942308E-03 | -1.032120E-05 | 2.930497E-06 |
| 82 | 0.000000E+00 | 0.000000E+00 | 1.739909E-03 | -5.565694E-04 | -2.397826E-06 |
| 31 | 0.000000E+00 | 0.000000E+00 | 2.019346E-04 | 1.402498E-04 | 2.021977E-05 |
| 32 | 0.000000E+00 | 0.000000E+00 | 5.818632E-03 | 5.997803E-05 | 5.673586E-05 |
| 51 | 0.000000E+00 | 0.000000E+00 | 5.583252E-03 | 2.268261E-04 | -7.403835E-05 |
| 52 | 0.000000E+00 | 0.000000E+00 | 8.293036E-03 | 8.140679E-05 | 4.305183E-06 |
| 61 | 2.871536E+00 | 0.000000E+00 | -3.310795E-03 | -4.235134E-05 | 1.340348E-05 |
| 62 | 0.000000E+00 | 0.000000E+00 | 2.324633E-03 | 1.146986E-04 | -5.685281E-05 |
| Surface | a10 | a12 | a14 | a16 | a18 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| Surface | a20 | | | | |
| 21 | 0.000000E+00 | | | | |
| 22 | 0.000000E+00 | | | | |
| 81 | 0.000000E+00 | | | | |
| 82 | 0.000000E+00 | | | | |
| 31 | 0.000000E+00 | | | | |
| 32 | 0.000000E+00 | | | | |
| 51 | 0.000000E+00 | | | | |
| 52 | 0.000000E+00 | | | | |
| 61 | 0.000000E+00 | | | | |
| 62 | 0.000000E+00 | | | | |

FIG. 17

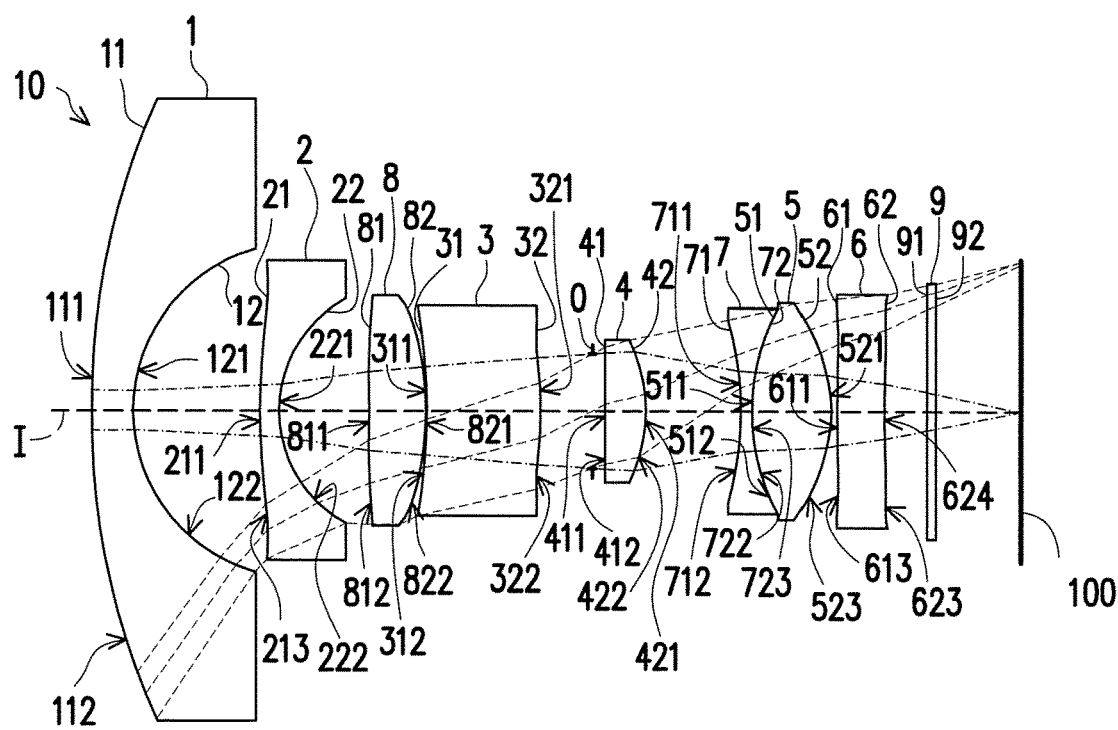
FIG. 18
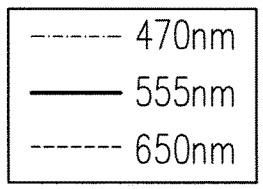
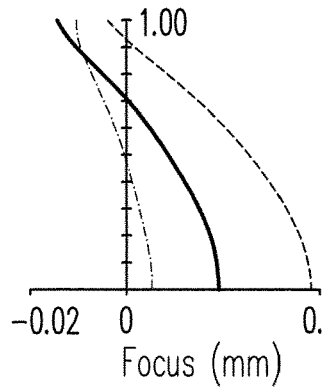
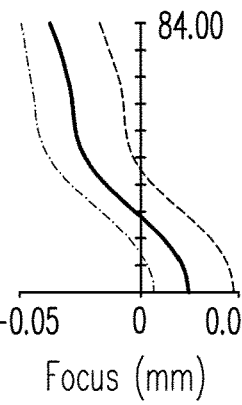
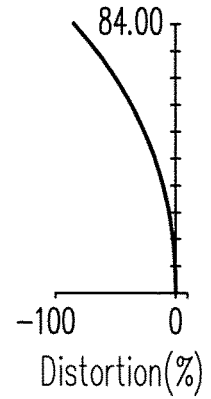
FIG. 19A   FIG. 19B   FIG. 19C   FIG. 19D

| Fourth embodiment ||||||
| EFL= 2.360 mm, HFOV= 60.148 Degree, TTL= 22.413 mm, Fno= 2.473 ||||||
| Element | Surface | Radius of curvature(mm) | Thickness (mm) | Refractive index | Abbe number | Focal length(mm) |
| --- | --- | --- | --- | --- | --- | --- |
| Object | | Infinity | Infinity | | | |
| First lens element 1 | Object-side surface 11 | 18.305 | 1.034 | 1.603 | 65.444 | -8.834 |
| | Image-side surface 12 | 4.047 | 3.029 | | | |
| Second lens element 2 | Object-side surface 21 | 13.047 | 0.472 | 1.545 | 55.987 | -7.612 |
| | Image-side surface 22 | 3.113 | 2.160 | | | |
| Eighth lens element 8 | Object-side surface 81 | -586.122 | 1.380 | 1.545 | 55.987 | 15.197 |
| | Image-side surface 82 | -8.193 | 0.030 | | | |
| Third lens element 3 | Object-side surface 31 | -10.649 | 2.726 | 1.661 | 20.401 | 48.821 |
| | Image-side surface 32 | -8.844 | 1.274 | | | |
| Aperture stop 0 | | Infinity | 0.278 | | | |
| Fourth lens element 4 | Object-side surface 41 | Infinity | 0.987 | 1.639 | 55.472 | 6.201 |
| | Image-side surface 42 | -3.972 | 2.301 | | | |
| Seventh lens element 7 | Object-side surface 71 | -8.183 | 0.278 | 1.661 | 20.401 | -9.481 |
| Fifth lens element 5 | Object-side surface 51 | 5.062 | 1.894 | 1.545 | 55.987 | 8.491 |
| | Image-side surface 52 | -3.973 | 0.147 | | | |
| Sixth lens element 6 | Object-side surface 61 | 39.311 | 1.136 | 1.545 | 55.987 | 276.854 |
| | Image-side surface 62 | 52.575 | 1.037 | | | |
| Light filter 9 | Object-side surface 91 | Infinity | 0.210 | 1.517 | 64.167 | |
| | Image-side surface 92 | Infinity | 2.040 | | | |
| | Image plane 100 | Infinity | | | | |

FIG. 20

| Surface | K | a2 | a4 | a6 | a8 |
|---|---|---|---|---|---|
| 21 | 0.000000E+00 | 0.000000E+00 | -1.777790E-03 | -7.006033E-05 | 1.241578E-05 |
| 22 | 0.000000E+00 | 0.000000E+00 | -1.270263E-03 | 1.490741E-04 | 1.847324E-05 |
| 81 | 0.000000E+00 | 0.000000E+00 | 1.174564E-03 | 3.806950E-04 | -1.511550E-05 |
| 82 | 0.000000E+00 | 0.000000E+00 | 3.844719E-04 | -6.252562E-04 | 1.020448E-04 |
| 31 | 0.000000E+00 | 0.000000E+00 | 2.677750E-03 | -5.428682E-04 | 1.685711E-04 |
| 32 | 0.000000E+00 | 0.000000E+00 | 6.029456E-03 | 4.266743E-04 | -6.168129E-05 |
| 71 | 0.000000E+00 | 0.000000E+00 | -1.690159E-03 | -7.193934E-05 | 3.085938E-04 |
| 51 | 0.000000E+00 | 0.000000E+00 | -2.975906E-03 | -7.998570E-04 | 5.165492E-04 |
| 52 | 0.000000E+00 | 0.000000E+00 | 7.709426E-04 | -8.363929E-05 | 1.765749E-04 |
| 61 | -2.370551E+02 | 0.000000E+00 | 6.080921E-03 | -4.268422E-03 | 9.586331E-04 |
| 62 | 0.000000E+00 | 0.000000E+00 | 9.218955E-03 | -4.852713E-03 | 9.985159E-04 |
| Surface | a10 | a12 | a14 | a16 | a18 |
| 21 | -1.149436E-06 | 5.723573E-08 | -1.253584E-09 | 0.000000E+00 | 0.000000E+00 |
| 22 | 1.164534E-05 | -2.258196E-06 | 9.755678E-08 | 0.000000E+00 | 0.000000E+00 |
| 81 | -1.126663E-05 | 1.506932E-06 | -6.448668E-08 | 0.000000E+00 | 0.000000E+00 |
| 82 | -1.980857E-05 | 1.762002E-06 | -6.638458E-08 | 0.000000E+00 | 0.000000E+00 |
| 31 | -2.304421E-05 | 1.266661E-06 | -3.001361E-08 | 0.000000E+00 | 0.000000E+00 |
| 32 | 5.444978E-05 | -1.010392E-05 | 7.543275E-07 | 0.000000E+00 | 0.000000E+00 |
| 71 | -1.022341E-04 | 1.422145E-05 | -7.320391E-07 | 0.000000E+00 | 0.000000E+00 |
| 51 | -9.272015E-05 | 7.549619E-06 | -2.064740E-07 | 0.000000E+00 | 0.000000E+00 |
| 52 | -4.211911E-05 | 4.075692E-06 | -1.445394E-07 | 0.000000E+00 | 0.000000E+00 |
| 61 | -1.276568E-04 | 1.036950E-05 | -3.667250E-07 | 0.000000E+00 | 0.000000E+00 |
| 62 | -1.211166E-04 | 9.132501E-06 | -2.965271E-07 | 0.000000E+00 | 0.000000E+00 |
| Surface | a20 | | | | |
| 21 | 0.000000E+00 | | | | |
| 22 | 0.000000E+00 | | | | |
| 81 | 0.000000E+00 | | | | |
| 82 | 0.000000E+00 | | | | |
| 31 | 0.000000E+00 | | | | |
| 32 | 0.000000E+00 | | | | |
| 71 | 0.000000E+00 | | | | |
| 51 | 0.000000E+00 | | | | |
| 52 | 0.000000E+00 | | | | |
| 61 | 0.000000E+00 | | | | |
| 62 | 0.000000E+00 | | | | |

FIG. 21

| Fifth embodiment ||||||
|---|---|---|---|---|---|---|
| EFL= 2.360 mm, HFOV= 53.420 Degree, TTL= 24.591 mm, Fno= 2.479 |||||||
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 16.015 | 1.588 | 1.603 | 65.444 | -9.060 |
| | Image-side surface 12 | 3.930 | 3.455 | | | |
| Second lens element 2 | Object-side surface 21 | 12.635 | 0.499 | 1.545 | 55.987 | -7.661 |
| | Image-side surface 22 | 3.100 | 2.308 | | | |
| Eighth lens element 8 | Object-side surface 81 | -15.341 | 1.654 | 1.545 | 55.987 | 17.051 |
| | Image-side surface 82 | -6.016 | 0.030 | | | |
| Third lens element 3 | Object-side surface 31 | -10.279 | 2.688 | 1.661 | 20.401 | 38.946 |
| | Image-side surface 32 | -8.133 | 1.148 | | | |
| Aperture stop 0 | | Infinity | 0.277 | | | |
| Fourth lens element 4 | Object-side surface 41 | Infinity | 0.974 | 1.639 | 55.472 | 6.922 |
| | Image-side surface 42 | -4.435 | 2.674 | | | |
| Seventh lens element 7 | Object-side surface 71 | -5.610 | 0.282 | 1.661 | 20.401 | -7.142 |
| Fifth lens element 5 | Object-side surface 51 | 5.766 | 1.232 | 1.545 | 55.987 | -78.928 |
| | Image-side surface 52 | -68.102 | 0.126 | | | |
| Sixth lens element 6 | Object-side surface 61 | 5.087 | 2.002 | 1.545 | 55.987 | 5.920 |
| | Image-side surface 62 | -7.643 | 1.421 | | | |
| Light filter 9 | Object-side surface 91 | Infinity | 0.210 | 1.517 | 64.167 | |
| | Image-side surface 92 | Infinity | 2.024 | | | |
| | Image plane 100 | Infinity | | | | |

FIG. 24

| Surface | K | a2 | a4 | a6 | a8 |
|---|---|---|---|---|---|
| 21 | 0.000000E+00 | 0.000000E+00 | -2.136179E-03 | -1.304397E-05 | 1.555329E-06 |
| 22 | 0.000000E+00 | 0.000000E+00 | -1.558920E-03 | -4.853070E-06 | 7.764299E-06 |
| 81 | 0.000000E+00 | 0.000000E+00 | 2.005371E-03 | 2.611043E-04 | -3.343586E-05 |
| 82 | 0.000000E+00 | 0.000000E+00 | 2.792394E-03 | -1.448583E-03 | 1.699894E-04 |
| 31 | 0.000000E+00 | 0.000000E+00 | 2.008519E-03 | -1.151889E-03 | 1.768531E-04 |
| 32 | 0.000000E+00 | 0.000000E+00 | 3.644705E-03 | 1.747629E-04 | 2.114472E-05 |
| 71 | 0.000000E+00 | 0.000000E+00 | 1.193817E-02 | -9.046401E-04 | 4.301970E-05 |
| 51 | 0.000000E+00 | 0.000000E+00 | 8.069587E-03 | -8.129599E-04 | 1.500645E-04 |
| 52 | 0.000000E+00 | 0.000000E+00 | 7.196689E-03 | -2.401665E-04 | 1.564586E-05 |
| 61 | -3.181354E-01 | 0.000000E+00 | -3.594158E-03 | 1.337877E-04 | -3.371734E-06 |
| 62 | 0.000000E+00 | 0.000000E+00 | 9.419466E-05 | -1.205464E-04 | 8.586236E-06 |

| Surface | a10 | a12 | a14 | a16 | a18 |
|---|---|---|---|---|---|
| 21 | -7.984021E-08 | 0.000000E+00 | 0.000000E+00 | 0.000000E+00 | 0.000000E+00 |
| 22 | 1.632612E-06 | 0.000000E+00 | 0.000000E+00 | 0.000000E+00 | 0.000000E+00 |
| 81 | 1.015615E-06 | 0.000000E+00 | 0.000000E+00 | 0.000000E+00 | 0.000000E+00 |
| 82 | -8.581198E-06 | 0.000000E+00 | 0.000000E+00 | 0.000000E+00 | 0.000000E+00 |
| 31 | -8.515503E-06 | 0.000000E+00 | 0.000000E+00 | 0.000000E+00 | 0.000000E+00 |
| 32 | 2.508253E-06 | 0.000000E+00 | 0.000000E+00 | 0.000000E+00 | 0.000000E+00 |
| 71 | -1.228394E-06 | 0.000000E+00 | 0.000000E+00 | 0.000000E+00 | 0.000000E+00 |
| 51 | -1.282840E-05 | 0.000000E+00 | 0.000000E+00 | 0.000000E+00 | 0.000000E+00 |
| 52 | -4.282958E-06 | 3.047775E-07 | 0.000000E+00 | 0.000000E+00 | 0.000000E+00 |
| 61 | 8.889903E-08 | 0.000000E+00 | 0.000000E+00 | 0.000000E+00 | 0.000000E+00 |
| 62 | 2.721822E-08 | 0.000000E+00 | 0.000000E+00 | 0.000000E+00 | 0.000000E+00 |

| Surface | a20 |
|---|---|
| 21 | 0.000000E+00 |
| 22 | 0.000000E+00 |
| 81 | 0.000000E+00 |
| 82 | 0.000000E+00 |
| 31 | 0.000000E+00 |
| 32 | 0.000000E+00 |
| 71 | 0.000000E+00 |
| 51 | 0.000000E+00 |
| 52 | 0.000000E+00 |
| 61 | 0.000000E+00 |
| 62 | 0.000000E+00 |

FIG. 25

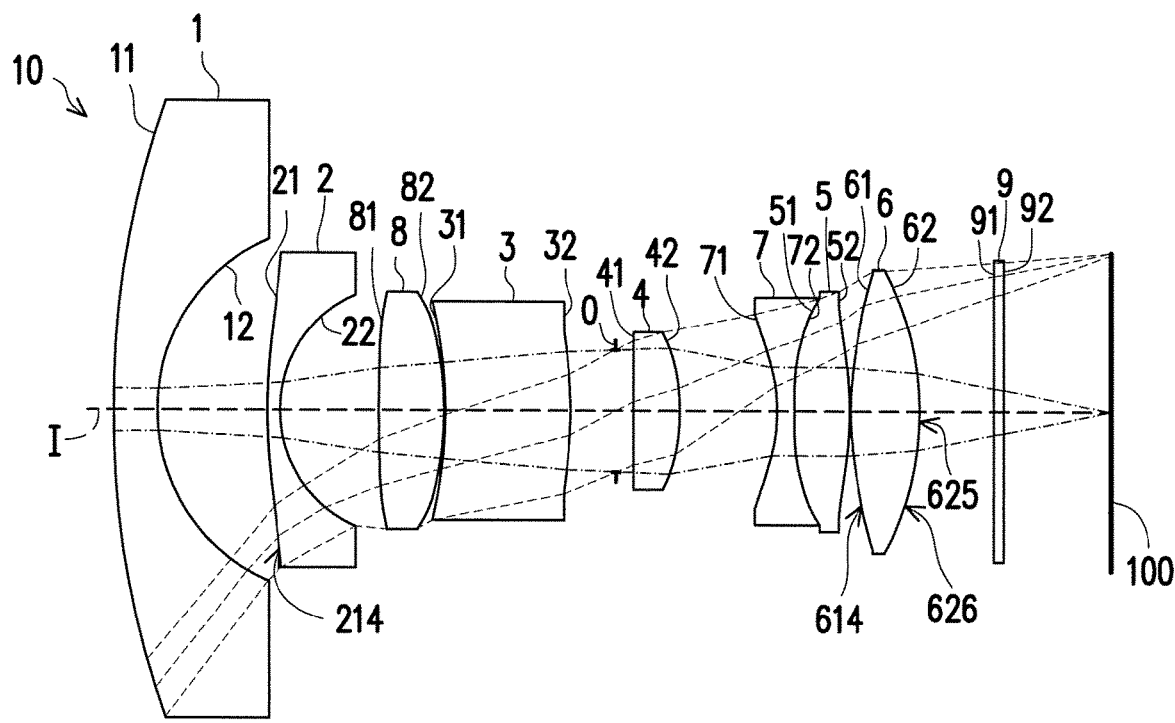
FIG. 26
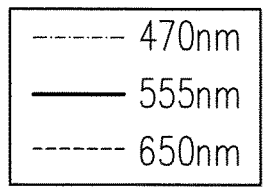
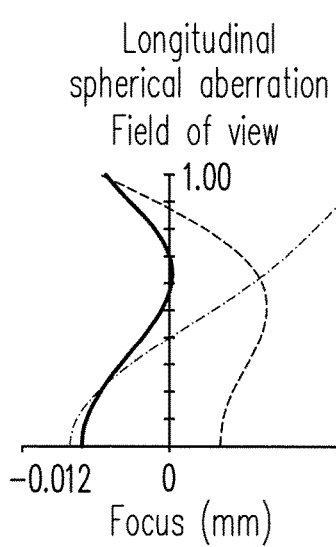
FIG. 27A
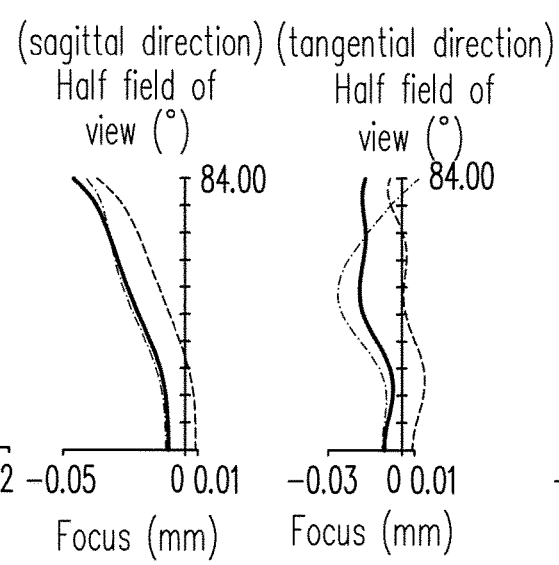
FIG. 27B  FIG. 27C
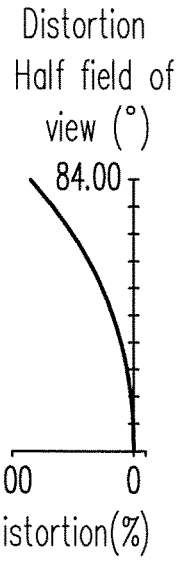
FIG. 27D

| Sixth embodiment ||||||
|---|---|---|---|---|---|
| EFL= 2.360 mm, HFOV= 66.307 Degree, TTL= 21.717 mm, Fno= 2.469 ||||||
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 20.353 | 0.948 | 1.603 | 65.444 | -8.582 |
| | Image-side surface 12 | 4.062 | 2.393 | | | |
| Second lens element 2 | Object-side surface 21 | 10.390 | 0.278 | 1.545 | 55.987 | -6.890 |
| | Image-side surface 22 | 2.737 | 2.160 | | | |
| Eighth lens element 8 | Object-side surface 81 | -4011.535 | 1.412 | 1.545 | 55.987 | 13.438 |
| | Image-side surface 82 | -7.328 | 0.030 | | | |
| Third lens element 3 | Object-side surface 31 | -9.946 | 2.735 | 1.661 | 20.401 | 31.750 |
| | Image-side surface 32 | -7.509 | 0.965 | | | |
| Aperture stop 0 | | Infinity | 0.387 | | | |
| Fourth lens element 4 | Object-side surface 41 | Infinity | 1.021 | 1.639 | 55.472 | 6.484 |
| | Image-side surface 42 | -4.154 | 2.114 | | | |
| Seventh lens element 7 | Object-side surface 71 | -3.342 | 0.369 | 1.661 | 20.401 | -4.732 |
| Fifth lens element 5 | Object-side surface 51 | 10.493 | 1.211 | 1.545 | 55.987 | 13.545 |
| | Image-side surface 52 | -6.464 | 0.007 | | | |
| Sixth lens element 6 | Object-side surface 61 | 7.313 | 1.509 | 1.545 | 55.987 | 6.646 |
| | Image-side surface 62 | -6.685 | 1.631 | | | |
| Light filter 9 | Object-side surface 91 | Infinity | 0.210 | 1.517 | 64.167 | |
| | Image-side surface 92 | Infinity | 2.336 | | | |
| | Image plane 100 | Infinity | | | | |

FIG. 28

| Surface | K | a2 | a4 | a6 | a8 |
|---|---|---|---|---|---|
| 21 | 0.000000E+00 | 0.000000E+00 | -1.935287E-03 | -5.058034E-05 | 7.622548E-06 |
| 22 | 0.000000E+00 | 0.000000E+00 | -1.767021E-03 | -1.040022E-04 | 3.683069E-05 |
| 81 | 0.000000E+00 | 0.000000E+00 | 3.374674E-03 | 3.623814E-04 | -3.851408E-05 |
| 82 | 0.000000E+00 | 0.000000E+00 | 8.954455E-04 | -2.484215E-04 | -4.641681E-05 |
| 31 | 0.000000E+00 | 0.000000E+00 | -2.278824E-04 | -8.390465E-05 | 5.009471E-05 |
| 32 | 0.000000E+00 | 0.000000E+00 | 4.105906E-03 | 2.724182E-04 | 5.295370E-05 |
| 71 | 0.000000E+00 | 0.000000E+00 | 1.337351E-02 | 5.059795E-04 | -1.651995E-04 |
| 51 | 0.000000E+00 | 0.000000E+00 | 4.273695E-03 | 1.399975E-03 | -2.027129E-04 |
| 52 | 0.000000E+00 | 0.000000E+00 | 6.676640E-03 | 0.000000E+00 | 0.000000E+00 |
| 61 | 4.089348E-02 | 0.000000E+00 | -1.796908E-03 | -1.632675E-04 | 2.072207E-05 |
| 62 | 0.000000E+00 | 1.366565E-03 | -1.943087E-04 | 4.576641E-07 | 7.319756E-07 |

| Surface | a10 | a12 | a14 | a16 | a18 |
|---|---|---|---|---|---|
| 21 | -2.770450E-07 | 0.000000E+00 | 0.000000E+00 | 0.000000E+00 | 0.000000E+00 |
| 22 | -7.213231E-07 | 0.000000E+00 | 0.000000E+00 | 0.000000E+00 | 0.000000E+00 |
| 81 | -3.851689E-07 | 0.000000E+00 | 0.000000E+00 | 0.000000E+00 | 0.000000E+00 |
| 82 | 1.105760E-06 | 0.000000E+00 | 0.000000E+00 | 0.000000E+00 | 0.000000E+00 |
| 31 | -5.248846E-06 | 0.000000E+00 | 0.000000E+00 | 0.000000E+00 | 0.000000E+00 |
| 32 | 1.903590E-06 | 0.000000E+00 | 0.000000E+00 | 0.000000E+00 | 0.000000E+00 |
| 71 | 1.368504E-05 | 0.000000E+00 | 0.000000E+00 | 0.000000E+00 | 0.000000E+00 |
| 51 | 5.730626E-06 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | -6.189623E-07 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |

| Surface | a20 |
|---|---|
| 21 | 0.000000E+00 |
| 22 | 0.000000E+00 |
| 81 | 0.000000E+00 |
| 82 | 0.000000E+00 |
| 31 | 0.000000E+00 |
| 32 | 0.000000E+00 |
| 71 | 0.000000E+00 |
| 51 | 0.000000E+00 |
| 52 | 0.000000E+00 |
| 61 | 0.000000E+00 |
| 62 | 0.000000E+00 |

FIG. 29

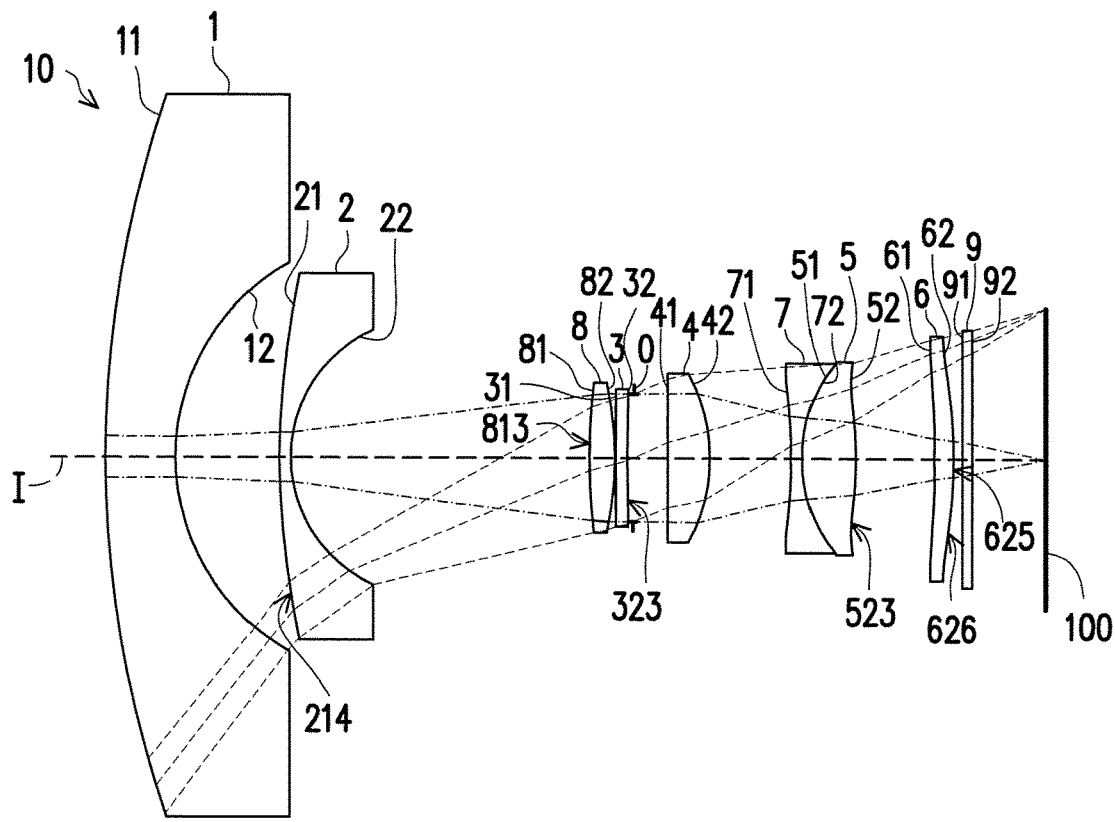
FIG. 30
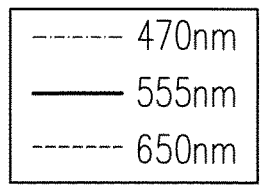
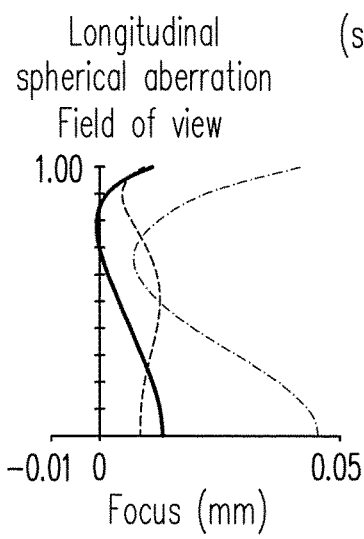
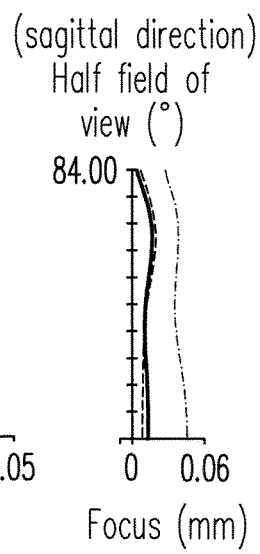
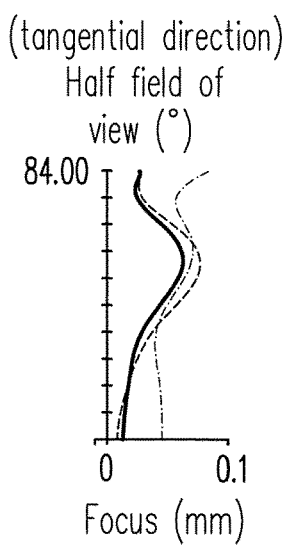
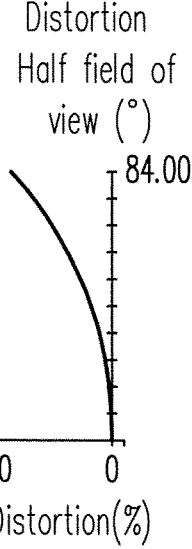
FIG. 31A  FIG. 31B  FIG. 31C  FIG. 31D

| Seventh embodiment | | | | | | |
|---|---|---|---|---|---|---|
| EFL= 2.359 mm, HFOV= 67.163 Degree, TTL= 21.508 mm, Fno= 2.470 | | | | | | |
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 25.062 | 1.611 | 1.603 | 65.444 | -10.940 |
| | Image-side surface 12 | 5.107 | 2.365 | | | |
| Second lens element 2 | Object-side surface 21 | 13.857 | 0.257 | 1.545 | 55.987 | -7.291 |
| | Image-side surface 22 | 3.073 | 6.832 | | | |
| Eighth lens element 8 | Object-side surface 81 | 10.979 | 0.586 | 1.545 | 55.987 | 8.484 |
| | Image-side surface 82 | -7.870 | 0.030 | | | |
| Third lens element 3 | Object-side surface 31 | -19.023 | 0.261 | 1.661 | 20.401 | -66.373 |
| | Image-side surface 32 | -33.566 | 0.117 | | | |
| Aperture stop 0 | | Infinity | 0.811 | | | |
| Fourth lens element 4 | Object-side surface 41 | Infinity | 0.957 | 1.639 | 55.472 | 6.514 |
| | Image-side surface 42 | -4.173 | 1.854 | | | |
| Seventh lens element 7 | Object-side surface 71 | -11.147 | 0.255 | 1.661 | 20.401 | -10.374 |
| Fifth lens element 5 | Object-side surface 51 | 3.309 | 1.205 | 1.545 | 55.987 | 79.971 |
| | Image-side surface 52 | -11.513 | 1.820 | | | |
| Sixth lens element 6 | Object-side surface 61 | 353.614 | 0.431 | 1.545 | 55.987 | 27.199 |
| | Image-side surface 62 | -15.503 | 0.200 | | | |
| Light filter 9 | Object-side surface 91 | Infinity | 0.210 | 1.517 | 64.167 | |
| | Image-side surface 92 | Infinity | 1.706 | | | |
| | Image plane 100 | Infinity | | | | |

FIG. 32

| Surface | K | a2 | a4 | a6 | a8 |
|---|---|---|---|---|---|
| 21 | 0.000000E+00 | 0.000000E+00 | -9.524530E-06 | -1.711479E-04 | 1.096220E-05 |
| 22 | 0.000000E+00 | 0.000000E+00 | 6.631544E-05 | -3.202434E-04 | 1.281812E-05 |
| 81 | 0.000000E+00 | 0.000000E+00 | -4.586597E-03 | 7.027055E-04 | -6.115706E-04 |
| 82 | 0.000000E+00 | 0.000000E+00 | 2.343487E-02 | -1.530540E-02 | 3.205664E-03 |
| 31 | 0.000000E+00 | 0.000000E+00 | 2.982138E-02 | -1.208057E-02 | 1.484773E-03 |
| 32 | 0.000000E+00 | 0.000000E+00 | 1.148240E-02 | 1.492521E-03 | -1.739765E-03 |
| 71 | 0.000000E+00 | 0.000000E+00 | -2.260959E-03 | 3.304239E-03 | -5.668131E-04 |
| 51 | 0.000000E+00 | 0.000000E+00 | -2.832141E-02 | 1.409305E-02 | -2.593379E-03 |
| 52 | 0.000000E+00 | 0.000000E+00 | 2.124273E-03 | 1.014122E-03 | -9.605955E-05 |
| 61 | 1.556379E+01 | 0.000000E+00 | -1.119469E-02 | 1.789228E-03 | -8.701948E-06 |
| 62 | 0.000000E+00 | 0.000000E+00 | -8.003966E-03 | 1.867683E-03 | -9.410129E-05 |

| Surface | a10 | a12 | a14 | a16 | a18 |
|---|---|---|---|---|---|
| 21 | -1.783556E-07 | 0.000000E+00 | 0.000000E+00 | 0.000000E+00 | 0.000000E+00 |
| 22 | -2.705544E-06 | 0.000000E+00 | 0.000000E+00 | 0.000000E+00 | 0.000000E+00 |
| 81 | 1.071038E-04 | 0.000000E+00 | 0.000000E+00 | 0.000000E+00 | 0.000000E+00 |
| 82 | -2.308351E-04 | 0.000000E+00 | 0.000000E+00 | 0.000000E+00 | 0.000000E+00 |
| 31 | -6.024433E-05 | 0.000000E+00 | 0.000000E+00 | 0.000000E+00 | 0.000000E+00 |
| 32 | 2.347567E-04 | 0.000000E+00 | 0.000000E+00 | 0.000000E+00 | 0.000000E+00 |
| 71 | 3.510331E-05 | 0.000000E+00 | 0.000000E+00 | 0.000000E+00 | 0.000000E+00 |
| 51 | 1.627547E-04 | 0.000000E+00 | 0.000000E+00 | 0.000000E+00 | 0.000000E+00 |
| 52 | 2.910680E-05 | -2.943966E-06 | 0.000000E+00 | 0.000000E+00 | 0.000000E+00 |
| 61 | -8.191420E-06 | 0.000000E+00 | 0.000000E+00 | 0.000000E+00 | 0.000000E+00 |
| 62 | -9.954657E-07 | 0.000000E+00 | 0.000000E+00 | 0.000000E+00 | 0.000000E+00 |

| Surface | a20 |
|---|---|
| 21 | 0.000000E+00 |
| 22 | 0.000000E+00 |
| 81 | 0.000000E+00 |
| 82 | 0.000000E+00 |
| 31 | 0.000000E+00 |
| 32 | 0.000000E+00 |
| 71 | 0.000000E+00 |
| 51 | 0.000000E+00 |
| 52 | 0.000000E+00 |
| 61 | 0.000000E+00 |
| 62 | 0.000000E+00 |

FIG. 33

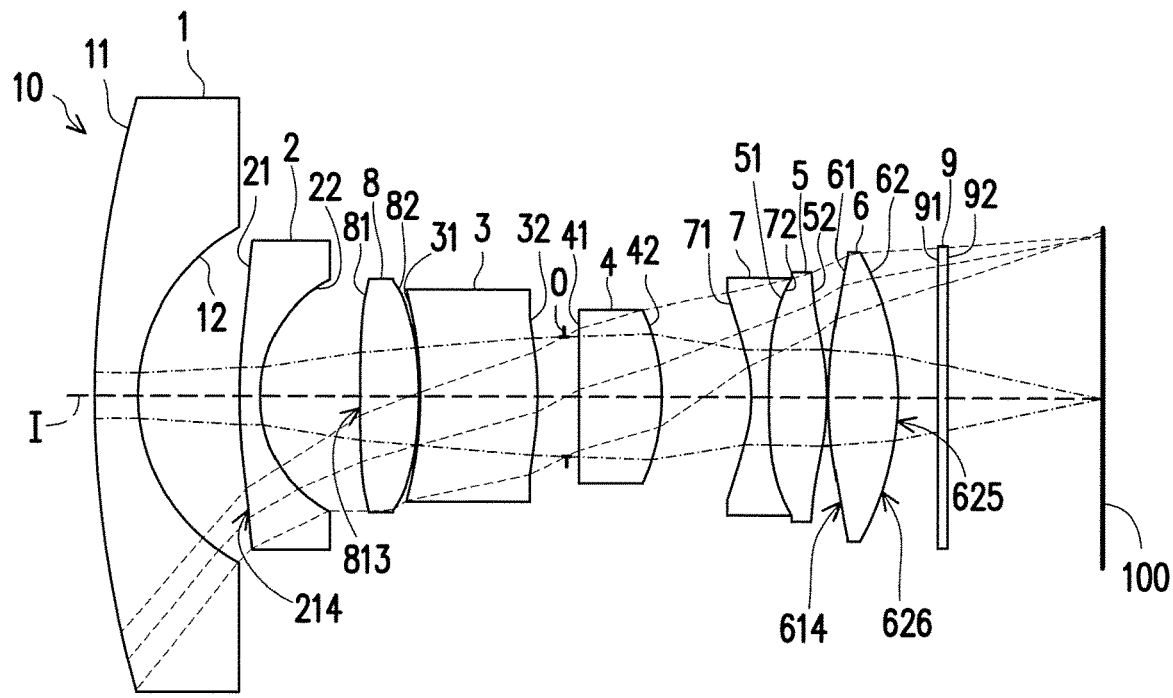
FIG. 34
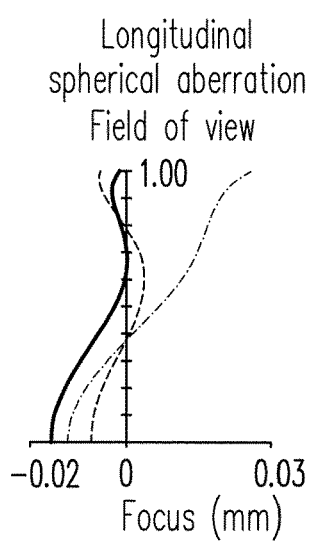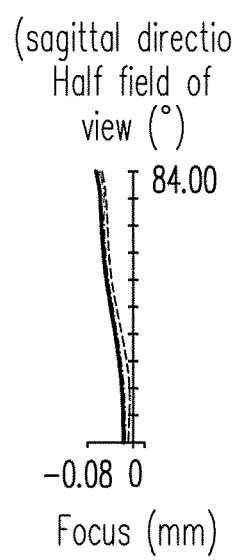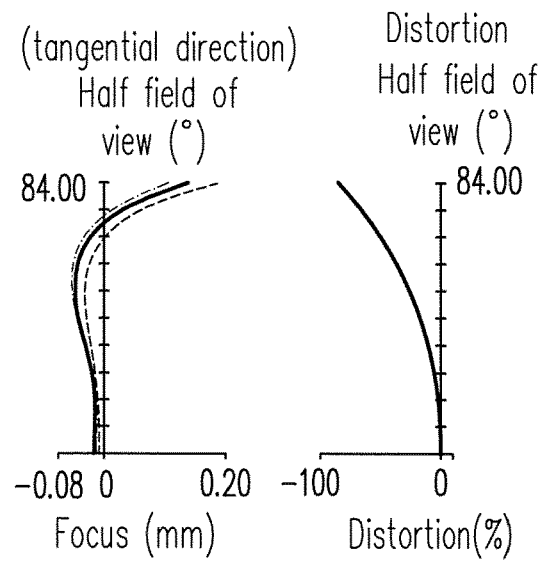
FIG. 35A   FIG. 35B   FIG. 35C   FIG. 35D

| \multicolumn{6}{|c|}{Eighth embodiment} |
|---|---|---|---|---|---|---|
| \multicolumn{6}{|c|}{EFL=2.360 mm, HFOV= 69.927 Degree, TTL= 21.251 mm, Fno= 2.442} |
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 22.416 | 0.914 | 1.603 | 65.444 | -8.252 |
| | Image-side surface 12 | 4.018 | 2.148 | | | |
| Second lens element 2 | Object-side surface 21 | 10.410 | 0.429 | 1.545 | 55.987 | -6.912 |
| | Image-side surface 22 | 2.730 | 2.106 | | | |
| Eighth lens element 8 | Object-side surface 81 | 98.245 | 1.239 | 1.545 | 55.987 | 11.561 |
| | Image-side surface 82 | -6.719 | 0.030 | | | |
| Third lens element 3 | Object-side surface 31 | -8.797 | 2.480 | 1.661 | 20.401 | 32.286 |
| | Image-side surface 32 | -6.948 | 0.571 | | | |
| Aperture stop 0 | | Infinity | 0.280 | | | |
| Fourth lens element 4 | Object-side surface 41 | Infinity | 1.759 | 1.639 | 55.472 | 6.798 |
| | Image-side surface 42 | -4.355 | 1.889 | | | |
| Seventh lens element 7 | Object-side surface 71 | -3.306 | 0.363 | 1.661 | 20.401 | -4.726 |
| Fifth lens element 5 | Object-side surface 51 | 12.496 | 1.223 | 1.545 | 55.987 | 11.386 |
| | Image-side surface 52 | -5.649 | 0.040 | | | |
| Sixth lens element 6 | Object-side surface 61 | 8.222 | 1.445 | 1.545 | 55.987 | 6.725 |
| | Image-side surface 62 | -6.228 | 0.852 | | | |
| Light filter 9 | Object-side surface 91 | Infinity | 0.210 | 1.517 | 64.167 | |
| | Image-side surface 92 | Infinity | 3.272 | | | |
| | Image plane 100 | Infinity | | | | |

FIG. 36

| Surface | K | a2 | a4 | a6 | a8 |
|---|---|---|---|---|---|
| 21 | 0.000000E+00 | 0.000000E+00 | -1.971996E-03 | -7.302316E-06 | -1.731119E-07 |
| 22 | 0.000000E+00 | 0.000000E+00 | -1.678389E-03 | -1.206484E-04 | 5.264740E-05 |
| 81 | 0.000000E+00 | 0.000000E+00 | 4.236951E-03 | 1.206670E-04 | -1.515879E-05 |
| 82 | 0.000000E+00 | 0.000000E+00 | 1.187672E-03 | -3.881430E-04 | -4.512444E-05 |
| 31 | 0.000000E+00 | 0.000000E+00 | -3.274728E-04 | 7.312879E-05 | -1.981073E-06 |
| 32 | 0.000000E+00 | 0.000000E+00 | 4.170505E-03 | 1.907612E-04 | 1.725899E-05 |
| 71 | 0.000000E+00 | 0.000000E+00 | 1.383882E-02 | 2.776101E-04 | -8.730816E-05 |
| 51 | 0.000000E+00 | 0.000000E+00 | 5.637847E-03 | 2.354393E-04 | -3.129362E-05 |
| 52 | 0.000000E+00 | 0.000000E+00 | 6.823616E-03 | 0.000000E+00 | 0.000000E+00 |
| 61 | -1.844985E-01 | 0.000000E+00 | -1.862487E-03 | -1.426780E-04 | 1.571880E-05 |
| 62 | 0.000000E+00 | 0.000000E+00 | 9.156922E-04 | -8.180127E-05 | -3.122229E-06 |

| Surface | a10 | a12 | a14 | a16 | a18 |
|---|---|---|---|---|---|
| 21 | -1.138832E-07 | 0.000000E+00 | 0.000000E+00 | 0.000000E+00 | 0.000000E+00 |
| 22 | -4.965686E-06 | 0.000000E+00 | 0.000000E+00 | 0.000000E+00 | 0.000000E+00 |
| 81 | -1.003659E-06 | 0.000000E+00 | 0.000000E+00 | 0.000000E+00 | 0.000000E+00 |
| 82 | 1.909254E-06 | 0.000000E+00 | 0.000000E+00 | 0.000000E+00 | 0.000000E+00 |
| 31 | 2.789997E-07 | 0.000000E+00 | 0.000000E+00 | 0.000000E+00 | 0.000000E+00 |
| 32 | 2.703981E-05 | 0.000000E+00 | 0.000000E+00 | 0.000000E+00 | 0.000000E+00 |
| 71 | 8.386173E-06 | 0.000000E+00 | 0.000000E+00 | 0.000000E+00 | 0.000000E+00 |
| 51 | -7.589874E-07 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | -3.931813E-07 | 0.000000E+00 | 0.000000E+00 | 0.000000E+00 | 0.000000E+00 |
| 62 | 6.434813E-07 | 0.000000E+00 | 0.000000E+00 | 0.000000E+00 | 0.000000E+00 |

| Surface | a20 |
|---|---|
| 21 | 0.000000E+00 |
| 22 | 0.000000E+00 |
| 81 | 0.000000E+00 |
| 82 | 0.000000E+00 |
| 31 | 0.000000E+00 |
| 32 | 0.000000E+00 |
| 71 | 0.000000E+00 |
| 51 | 0.000000E+00 |
| 52 | 0.000000E+00 |
| 61 | 0.000000E+00 |
| 62 | 0.000000E+00 |

FIG. 37

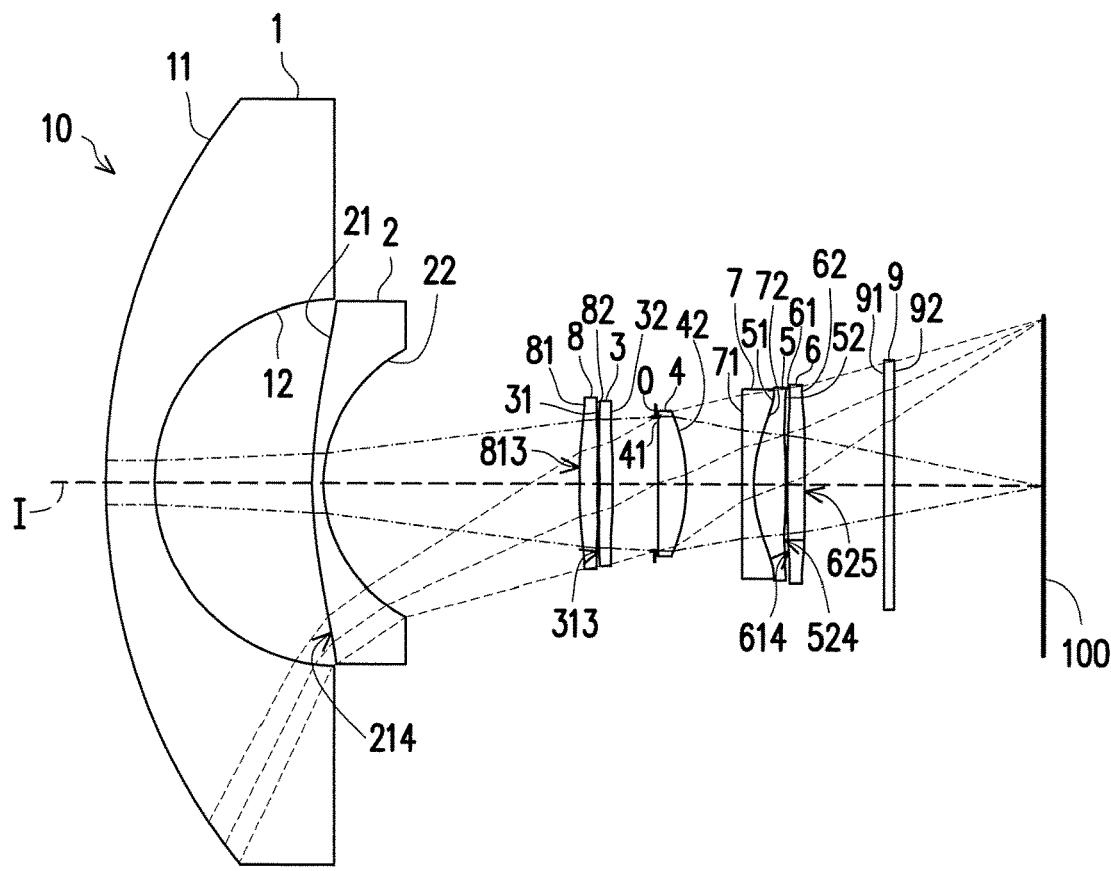
FIG. 38
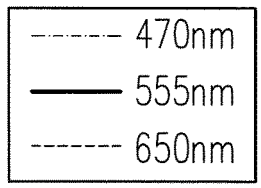
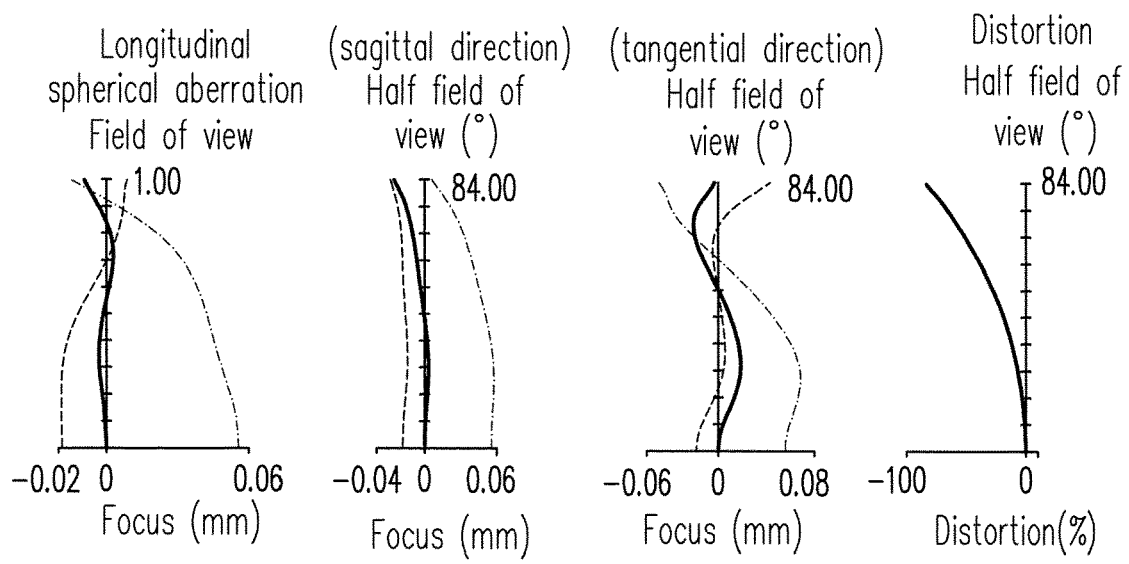
FIG. 39A   FIG. 39B   FIG. 39C   FIG. 39D

| Ninth embodiment | | | | | | |
|---|---|---|---|---|---|---|
| EFL= 2.370 mm, HFOV= 47.778 Degree, TTL= 19.359 mm, Fno= 2.538 | | | | | | |
| Element | Surface | Radius of curvature(mm) | Thickness (mm) | Refractive index | Abbe number | Focal length(mm) |
| Object | | Infinity | Infinity | | | |
| First lens element 1 | Object-side surface 11 | 12.741 | 0.999 | 1.603 | 65.444 | -9.398 |
| | Image-side surface 12 | 3.814 | 3.254 | | | |
| Second lens element 2 | Object-side surface 21 | 9.269 | 0.240 | 1.545 | 55.987 | -8.358 |
| | Image-side surface 22 | 3.031 | 5.277 | | | |
| Eighth lens element 8 | Object-side surface 81 | 8.335 | 0.376 | 1.545 | 55.987 | 14.199 |
| | Image-side surface 82 | -110.007 | 0.030 | | | |
| Third lens element 3 | Object-side surface 31 | -20.671 | 0.278 | 1.661 | 20.401 | 83.184 |
| | Image-side surface 32 | -15.137 | 0.896 | | | |
| Aperture stop 0 | | Infinity | 0.050 | | | |
| Fourth lens element 4 | Object-side surface 41 | Infinity | 0.579 | 1.639 | 55.472 | 6.146 |
| | Image-side surface 42 | -3.937 | 1.156 | | | |
| Seventh lens element 7 | Object-side surface 71 | -86.694 | 0.240 | 1.661 | 20.401 | -19.185 |
| Fifth lens element 5 | Object-side surface 51 | 2.705 | 0.652 | 1.545 | 55.987 | 201.628 |
| | Image-side surface 52 | -11.277 | 0.040 | | | |
| Sixth lens element 6 | Object-side surface 61 | 201.818 | 0.357 | 1.545 | 55.987 | 126.784 |
| | Image-side surface 62 | -105.379 | 1.631 | | | |
| Light filter 9 | Object-side surface 91 | Infinity | 0.210 | 1.517 | 64.167 | |
| | Image-side surface 92 | Infinity | 3.095 | | | |
| | Image plane 100 | Infinity | | | | |

FIG. 40

| Surface | K | a2 | a4 | a6 | a8 |
|---|---|---|---|---|---|
| 21 | 0.000000E+00 | 0.000000E+00 | -1.408435E-03 | -5.047506E-05 | 3.861097E-06 |
| 22 | 0.000000E+00 | 0.000000E+00 | -3.055780E-04 | -3.021035E-04 | 2.971458E-05 |
| 81 | 0.000000E+00 | 0.000000E+00 | -7.441878E-03 | -1.672445E-03 | 4.785320E-04 |
| 82 | 0.000000E+00 | 0.000000E+00 | -6.264895E-03 | 2.392558E-03 | -2.274029E-04 |
| 31 | 0.000000E+00 | 0.000000E+00 | 9.802100E-03 | 2.252052E-03 | -9.764563E-04 |
| 32 | 0.000000E+00 | 0.000000E+00 | 1.390668E-02 | -2.362367E-04 | -7.419503E-04 |
| 71 | 0.000000E+00 | 0.000000E+00 | -2.573073E-04 | 1.361675E-03 | -3.752921E-04 |
| 51 | 0.000000E+00 | 0.000000E+00 | -3.001808E-02 | 4.795787E-03 | -1.540750E-03 |
| 52 | 0.000000E+00 | 0.000000E+00 | 3.332200E-02 | -1.240722E-02 | 3.038513E-03 |
| 61 | 8.856890E+03 | 0.000000E+00 | 2.417410E-02 | -1.268365E-02 | 2.471547E-03 |
| 62 | 0.000000E+00 | 0.000000E+00 | -2.965960E-03 | -2.905487E-04 | -2.714963E-04 |

| Surface | a10 | a12 | a14 | a16 | a18 |
|---|---|---|---|---|---|
| 21 | -3.867412E-08 | 0.000000E+00 | 0.000000E+00 | 0.000000E+00 | 0.000000E+00 |
| 22 | -3.750928E-06 | 0.000000E+00 | 0.000000E+00 | 0.000000E+00 | 0.000000E+00 |
| 81 | -3.185820E-05 | 0.000000E+00 | 0.000000E+00 | 0.000000E+00 | 0.000000E+00 |
| 82 | 6.798783E-06 | 0.000000E+00 | 0.000000E+00 | 0.000000E+00 | 0.000000E+00 |
| 31 | 8.368361E-06 | 0.000000E+00 | 0.000000E+00 | 0.000000E+00 | 0.000000E+00 |
| 32 | 4.474857E-05 | 0.000000E+00 | 0.000000E+00 | 0.000000E+00 | 0.000000E+00 |
| 71 | 2.786791E-05 | 0.000000E+00 | 0.000000E+00 | 0.000000E+00 | 0.000000E+00 |
| 51 | 9.236736E-05 | 0.000000E+00 | 0.000000E+00 | 0.000000E+00 | 0.000000E+00 |
| 52 | -3.553458E-04 | 8.689423E-06 | 0.000000E+00 | 0.000000E+00 | 0.000000E+00 |
| 61 | -1.746121E-04 | 0.000000E+00 | 0.000000E+00 | 0.000000E+00 | 0.000000E+00 |
| 62 | 8.832191E-05 | 0.000000E+00 | 0.000000E+00 | 0.000000E+00 | 0.000000E+00 |

| Surface | a20 |
|---|---|
| 21 | 0.000000E+00 |
| 22 | 0.000000E+00 |
| 81 | 0.000000E+00 |
| 82 | 0.000000E+00 |
| 31 | 0.000000E+00 |
| 32 | 0.000000E+00 |
| 71 | 0.000000E+00 |
| 51 | 0.000000E+00 |
| 52 | 0.000000E+00 |
| 61 | 0.000000E+00 |
| 62 | 0.000000E+00 |

FIG. 41

| Conditional expression | First embodiment |
| --- | --- |
| T1 | 1.000 |
| G12 | 1.968 |
| T2 | 1.000 |
| G23 | 2.537 |
| T3 | 1.174 |
| G34 | 1.810 |
| T4 | 1.300 |
| G45 | 0.288 |
| T5 | 1.130 |
| G56 | 2.208 |
| T6 | 1.685 |
| G6F | 0.600 |
| TF | 0.210 |
| GFP | 1.090 |
| ALT | 7.289 |
| AAG | 8.811 |
| BFL | 1.900 |
| TTL | 17.999 |
| TL | 16.099 |
| (G12+G23) / T6 | 2.674 |
| (T1+T6) / T2 | 2.685 |
| (G12+G23) / T2 | 4.505 |
| TTL / (G12+G23) | 3.995 |
| TTL / (T2+T6) | 6.705 |
| TTL / (T6+G12) | 4.927 |
| AAG / T6 | 5.230 |
| AAG / (T1+T2) | 4.405 |
| AAG / (T1+G23) | 2.491 |
| BFL / (T2+G12) | 0.640 |
| ALT / G23 | 2.873 |
| ALT / (T1+G23) | 2.061 |
| ALT / (T2+G23) | 2.061 |
| TL / T1 | 16.094 |
| TL / G12 | 8.179 |
| TL / (T1+T6) | 5.996 |
| TL / (T1+G12) | 5.423 |
| TL / (T6+G23) | 3.814 |
| BFL / T1 | 1.899 |
| BFL / G23 | 0.749 |

FIG. 42

| Conditional expression | Second embodiment |
|---|---|
| T1 | 1.000 |
| G12 | 2.798 |
| T2 | 0.280 |
| G23 | 1.963 |
| T3 | 2.483 |
| G34 | 1.401 |
| T4 | 1.245 |
| G47 | 0.473 |
| T7 | 0.625 |
| G75 | 0.000 |
| T5 | 1.096 |
| G56 | 0.392 |
| T6 | 1.789 |
| G6F | 1.631 |
| TF | 0.210 |
| GFP | 3.258 |
| ALT | 8.518 |
| AAG | 7.027 |
| BFL | 5.099 |
| TTL | 20.644 |
| TL | 15.545 |
| (G12+G23) / T6 | 2.662 |
| (T1+T6) / T2 | 9.960 |
| (G12+G23) / T2 | 17.005 |
| TTL / (G12+G23) | 4.336 |
| TTL / (T2+T6) | 9.979 |
| TTL / (T6+G12) | 4.501 |
| AAG / T6 | 3.928 |
| AAG / (T1+T2) | 5.490 |
| AAG / (T1+G23) | 2.371 |
| BFL / (T2+G12) | 1.657 |
| ALT / G23 | 4.339 |
| ALT / (T1+G23) | 2.875 |
| ALT / (T2+G23) | 3.797 |
| TL / T1 | 15.545 |
| TL / G12 | 5.556 |
| TL / (T1+T6) | 5.574 |
| TL / (T1+G12) | 4.093 |
| TL / (T6+G23) | 4.143 |
| BFL / T1 | 5.099 |
| BFL / G23 | 2.597 |

FIG. 43

| Conditional expression | Third embodiment |
|---|---|
| T1 | 1.000 |
| G12 | 2.355 |
| T2 | 0.367 |
| G28 | 1.926 |
| T8 | 1.172 |
| G83 | 0.637 |
| T3 | 0.824 |
| G34 | 1.882 |
| T4 | 1.293 |
| G45 | 1.665 |
| T5 | 1.516 |
| G56 | 0.235 |
| T6 | 1.727 |
| G6F | 0.200 |
| TF | 0.210 |
| GFP | 1.615 |
| ALT | 7.899 |
| AAG | 8.700 |
| BFL | 2.025 |
| TTL | 18.625 |
| TL | 16.599 |
| (G12+G28) / T6 | 2.479 |
| (T1+T6) / T2 | 7.431 |
| (G12+G28) / T2 | 11.666 |
| TTL / (G12+G28) | 4.350 |
| TTL / (T2+T6) | 8.893 |
| TTL / (T6+G12) | 4.562 |
| AAG / T6 | 5.037 |
| AAG / (T1+T2) | 6.364 |
| AAG / (T1+G28) | 2.973 |
| BFL / (T2+G1) | 0.744 |
| ALT / G2 | 4.101 |
| ALT / (T1+G28) | 2.699 |
| ALT / (T2+G28) | 3.444 |
| TL / T1 | 16.599 |
| TL / G12 | 7.048 |
| TL / (T1+T6) | 6.086 |
| TL / (T1+G12) | 4.947 |
| TL / (T6+G28) | 4.543 |
| BFL / T1 | 2.025 |
| BFL / G28 | 1.051 |

FIG. 44

| Conditional expression | Fourth embodiment | Fifth embodiment | Sixth embodiment | Seventh embodiment | Eighth embodiment | Ninth embodiment |
|---|---|---|---|---|---|---|
| T1 | 1.034 | 1.588 | 0.948 | 1.611 | 0.914 | 0.999 |
| G12 | 3.029 | 3.455 | 2.393 | 2.365 | 2.148 | 3.254 |
| T2 | 0.472 | 0.499 | 0.278 | 0.257 | 0.429 | 0.240 |
| G28 | 2.160 | 2.308 | 2.160 | 6.832 | 2.106 | 5.277 |
| T8 | 1.380 | 1.654 | 1.412 | 0.586 | 1.239 | 0.376 |
| G83 | 0.030 | 0.030 | 0.030 | 0.030 | 0.030 | 0.030 |
| T3 | 2.726 | 2.688 | 2.735 | 0.261 | 2.480 | 0.278 |
| G34 | 1.552 | 1.425 | 1.352 | 0.928 | 0.852 | 0.946 |
| T4 | 0.987 | 0.974 | 1.021 | 0.957 | 1.759 | 0.579 |
| G45 | 2.301 | 2.674 | 2.114 | 1.854 | 1.889 | 1.156 |
| T7 | 0.278 | 0.282 | 0.369 | 0.255 | 0.363 | 0.240 |
| G75 | 0.000 | 0.000 | 0.000 | 0.000 | 0.000 | 0.000 |
| T5 | 1.894 | 1.232 | 1.211 | 1.205 | 1.223 | 0.652 |
| G56 | 0.147 | 0.126 | 0.007 | 1.820 | 0.040 | 0.040 |
| T6 | 1.136 | 2.002 | 1.509 | 0.431 | 1.445 | 0.357 |
| G6F | 1.037 | 1.421 | 1.631 | 0.200 | 0.852 | 1.631 |
| TF | 0.210 | 0.210 | 0.210 | 0.210 | 0.210 | 0.210 |
| GFP | 2.040 | 2.024 | 2.336 | 1.706 | 3.272 | 3.095 |
| ALT | 9.907 | 10.919 | 9.485 | 5.563 | 9.853 | 3.720 |
| AAG | 9.219 | 10.017 | 8.056 | 13.829 | 7.065 | 10.703 |
| BFL | 3.287 | 3.655 | 4.177 | 2.116 | 4.333 | 4.936 |
| TTL | 22.413 | 24.590 | 21.717 | 21.508 | 21.252 | 19.359 |
| TL | 19.126 | 20.936 | 17.540 | 19.392 | 16.918 | 14.423 |
| (G12+G28)/T6 | 4.569 | 2.879 | 3.017 | 21.354 | 2.945 | 23.906 |
| (T1+T6)/T2 | 4.599 | 7.190 | 8.826 | 7.931 | 5.494 | 5.650 |
| (G12+G28)/T2 | 11.001 | 11.543 | 16.354 | 35.723 | 9.908 | 35.544 |
| TTL/(G12+G28) | 4.319 | 4.267 | 4.770 | 2.339 | 4.995 | 2.269 |
| TTL/(T2+T6) | 13.943 | 9.832 | 12.151 | 31.254 | 11.339 | 32.436 |
| TTL/(T6+G12) | 5.381 | 4.507 | 5.566 | 7.694 | 5.914 | 5.362 |
| AAG/T6 | 8.117 | 5.004 | 5.339 | 32.108 | 4.890 | 29.993 |
| AAG/(T1+T2) | 6.123 | 4.800 | 6.569 | 7.400 | 5.257 | 8.638 |
| AAG/(T1+G28) | 2.886 | 2.571 | 2.592 | 1.638 | 2.339 | 1.705 |
| BFL/(T2+G1) | 0.939 | 0.924 | 1.564 | 0.807 | 1.681 | 1.413 |
| ALT/G28 | 4.587 | 4.731 | 4.391 | 0.814 | 4.679 | 0.705 |
| ALT/(T1+G28) | 3.102 | 2.803 | 3.052 | 0.659 | 3.262 | 0.593 |
| ALT/(T2+G28) | 3.764 | 3.890 | 3.890 | 0.785 | 3.887 | 0.674 |
| TL/T1 | 18.500 | 13.187 | 18.502 | 12.036 | 18.500 | 14.436 |
| TL/G12 | 6.314 | 6.060 | 7.331 | 8.200 | 7.875 | 4.433 |
| TL/(T1+T6) | 8.816 | 5.833 | 7.139 | 9.497 | 7.171 | 10.637 |
| TL/(T1+G12) | 4.707 | 4.152 | 5.251 | 4.877 | 5.524 | 3.391 |
| TL/(T6+G28) | 5.803 | 4.858 | 4.781 | 2.670 | 4.765 | 2.560 |
| BFL/T1 | 3.179 | 2.302 | 4.406 | 1.313 | 4.739 | 4.941 |
| BFL/G28 | 1.522 | 1.584 | 1.934 | 0.310 | 2.058 | 0.935 |

FIG. 45

OPTICAL IMAGING LENS

CROSS-REFERENCE TO RELATED APPLICATION

This application claims the priority benefit of Chinese application serial no. 201710437167.8, filed on Jun. 12, 2017. The entirety of the above-mentioned patent application is hereby incorporated by reference herein and made a part of this specification.

BACKGROUND OF THE INVENTION

Field of the Invention

The invention relates to an optical lens, and particularly relates to an optical imaging lens.

Description of Related Art

In recent years, along with wide use of mobile electronic products such as mobile phones, digital cameras, etc., techniques related to image module are quickly developed. The image module mainly includes components such as an optical imaging lens, a module holder unit, a sensor, etc., and a thinning and lightweight trend of the mobile phones and the digital cameras increases a miniaturization demand of the optical imaging lens.

However, a distance between an object-side surface of the first lens element of a conventional optical imaging lens and an image plane is long, which is disadvantageous for the miniaturization of the optical imaging lens. Moreover, the focal length of the conventional optical imaging lens is varies with temperature change, and the performance of athermalization of the conventional optical imaging lens is not good. Therefore, an optical imaging lens having a short system length, a large half field of view, good imaging quality and a good performance of athermalization is urgently need to be developed.

SUMMARY OF THE INVENTION

The invention is directed to an optical imaging lens, having a good performance of athermalization of the optical imaging lens and good imaging quality.

An embodiment of the invention provides an optical imaging lens at least including a first lens element, a second lens element, a third lens element, a fourth lens element, a fifth lens element and a sixth lens element arranged in a sequence from an object side to an image side along an optical axis is provided. Each of the first lens element to the sixth lens element has an object-side surface facing the object side and pervious to imaging rays and an image-side surface facing the image side and pervious to the imaging rays. The first lens element has a negative refracting power. The object-side surface of the second lens element has a convex portion in a vicinity of the optical axis. The third lens element is a first lens having a refracting power and sequentially counted from an aperture stop toward the object side, and the image-side surface of the third lens element has a convex portion in a vicinity of the optical axis. The fourth lens element is a first lens having a refracting power and sequentially counted from an aperture stop toward the image side, and the image-side surface of the fourth lens element has a convex portion in a vicinity of the optical axis. The fifth lens element is a second lens having a refracting power and sequentially counted from the image side toward the object side, and the image-side surface of the fifth lens element has a convex portion in a vicinity of the optical axis. The sixth lens element is a first lens having a refracting power and sequentially counted from the image side toward the object side, and the sixth lens element has a positive refracting power. At least one of the third lens element and the fourth lens element has a positive refracting power, and is a glass material. The optical imaging lens is complied with: $2.4 \leq (G1+G2)/T6$, wherein G1 is a distance between the image-side surface of the first lens element and the object-side surface of the second lens element on the optical axis, G2 is a distance between the image-side surface of the second lens element and an object-side surface, facing the object side, of a first lens having a refracting power and sequentially counted from the second lens element toward the image side on the optical axis, and T6 is a thickness of the sixth lens element on the optical axis.

According to the above descriptions, advantageous effects of the optical imaging lens according to the embodiments of the invention are as follows. At least one lens element adjacent to the aperture stop has a positive refracting power and is a glass material. Thereby, the optical imaging lens according to the embodiments of the invention can achieve a good performance of athermalization and good imaging quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating a surface shape structure of a lens.

FIG. 2 is a schematic diagram illustrating surface shape concave and convex structures and a light focal point.

FIG. 3 is a schematic diagram illustrating a surface shape structure of a lens of a first example.

FIG. 4 is a schematic diagram illustrating a surface shape structure of a lens of a second example.

FIG. 5 is a schematic diagram illustrating a surface shape structure of a lens of a third example.

FIG. 8 shows detailed optical data of the optical imaging lens of the first embodiment.

FIG. 9 shows aspheric parameters of the optical imaging lens of the first embodiment.

FIG. 10 is a schematic diagram of an optical imaging lens of a second embodiment of the invention.

FIG. 11A-FIG. 11D are diagrams of a longitudinal spherical aberration and various aberrations of the optical imaging lens of the second embodiment.

FIG. 12 shows detailed optical data of the optical imaging lens of the second embodiment.

FIG. 13 shows aspheric parameters of the optical imaging lens of the second embodiment.

FIG. 14 is a schematic diagram of an optical imaging lens of a third embodiment of the invention.

FIG. 15A-FIG. 15D are diagrams of a longitudinal spherical aberration and various aberrations of the optical imaging lens of the third embodiment.

FIG. 16 shows detailed optical data of the optical imaging lens of the third embodiment.

FIG. 17 shows aspheric parameters of the optical imaging lens of the third embodiment.

FIG. 18 is a schematic diagram of an optical imaging lens of a fourth embodiment of the invention.

FIG. 19A-FIG. 19D are diagrams of a longitudinal spherical aberration and various aberrations of the optical imaging lens of the fourth embodiment.

FIG. 20 shows detailed optical data of the optical imaging lens of the fourth embodiment.

FIG. 21 shows aspheric parameters of the optical imaging lens of the fourth embodiment.

FIG. 24 shows detailed optical data of the optical imaging lens of the fifth embodiment.

FIG. 25 shows aspheric parameters of the optical imaging lens of the fifth embodiment.

FIG. 26 is a schematic diagram of an optical imaging lens of a sixth embodiment of the invention.

FIG. 27A-FIG. 27D are diagrams of a longitudinal spherical aberration and various aberrations of the optical imaging lens of the sixth embodiment.

FIG. 28 shows detailed optical data of the optical imaging lens of the sixth embodiment.

FIG. 29 shows aspheric parameters of the optical imaging lens of the sixth embodiment.

FIG. 30 is a schematic diagram of an optical imaging lens of a seventh embodiment of the invention.

FIG. 31A-FIG. 31D are diagrams of a longitudinal spherical aberration and various aberrations of the optical imaging lens of the seventh embodiment.

FIG. 32 shows detailed optical data of the optical imaging lens of the seventh embodiment.

FIG. 33 shows aspheric parameters of the optical imaging lens of the seventh embodiment.

FIG. 34 is a schematic diagram of an optical imaging lens of an eighth embodiment of the invention.

FIG. 35A-FIG. 35D are diagrams of a longitudinal spherical aberration and various aberrations of the optical imaging lens of the eighth embodiment.

FIG. 36 shows detailed optical data of the optical imaging lens of the eighth embodiment.

FIG. 37 shows aspheric parameters of the optical imaging lens of the eighth embodiment.

FIG. 38 is a schematic diagram of an optical imaging lens of a ninth embodiment of the invention.

FIG. 39A-FIG. 39D are diagrams of a longitudinal spherical aberration and various aberrations of the optical imaging lens of the ninth embodiment.

FIG. 40 shows detailed optical data of the optical imaging lens of the ninth embodiment.

FIG. 41 shows aspheric parameters of the optical imaging lens of the ninth embodiment.

FIG. 42 is a table diagram of various important parameters and expressions of the optical imaging lens of the first embodiment of the invention.

FIG. 43 is a table diagram of various important parameters and expressions of the optical imaging lens of the second embodiment of the invention.

FIG. 44 is a table diagram of various important parameters and expressions of the optical imaging lens of the third embodiment of the invention.

FIG. 45 is a table diagram of various important parameters and expressions of the optical imaging lenses of the fourth to the ninth embodiments of the invention.

DESCRIPTION OF EMBODIMENTS

Figure 6:
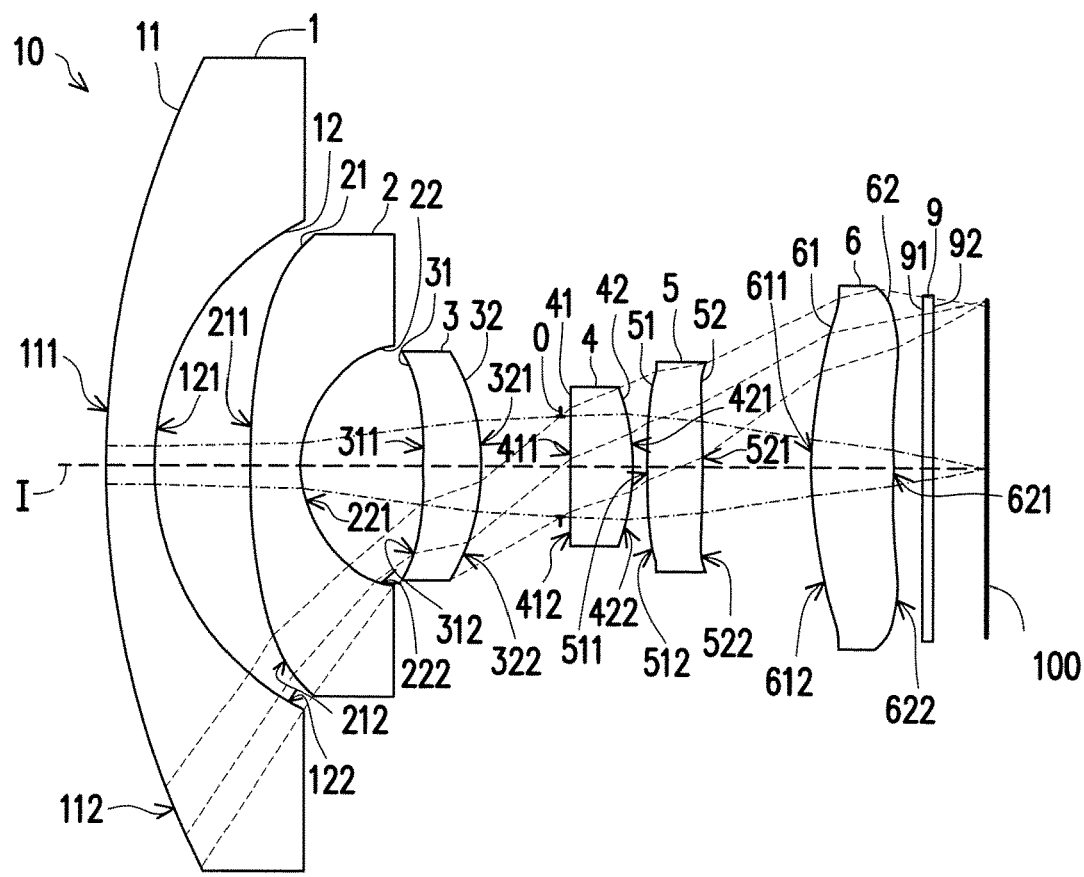
FIG. 6 is a schematic diagram of an optical imaging lens of a first embodiment of the invention.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is defined as a point of intersection of that surface and the optical axis. The transition point is defined as a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of the effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to that the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because that the R value at the object-side surface of the lens element is positive. The portion in a vicinity of a periphery of the lens element (portion III) has a convex shape. What is more, there is another portion having a concave shape existing between the first and second transition points (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic diagram of an optical imaging lens according to a first embodiment of the invention, and FIG. 7A-FIG. 7D are diagrams of a longitudinal spherical aberration and various aberrations of the optical imaging lens of the first embodiment. Referring to FIG. 6, the optical imaging lens 10 of the first embodiment of the invention sequentially includes a first lens element 1, a second lens element 2, a third lens element 3, an aperture stop 0, a fourth lens element 4, a fifth lens element 5, a sixth lens element 6 and a light filter 9 arranged in a sequence from an object side to an image side along an optical axis I. When a light emitted by an object to be captured enters the optical imaging lens 10, after the light passes through the first lens element 1, the second lens element 2, the third lens element 3, the aperture stop 0, the fourth lens element 4, the fifth lens element 5, the sixth lens element 6 and the light filter 9, an image is formed on an image plane 100. It should be noted that the object side is a side facing the object to be captured, and the image side is a side facing the image plane 100.

The first lens element 1, the second lens element 2, the third lens element 3, the fourth lens element 4, the fifth lens element 5, the sixth lens element 6 and the light filter 9 respectively have object-side surfaces 11, 21, 31, 41, 51, 61, 91 facing toward the object side and pervious to imaging rays and image-side surfaces 12, 22, 32, 42, 52, 62, 92 facing toward the image side and pervious to the imaging rays.

In order to achieve a good performance of athermalization and good imaging quality, at least one lens element adjacent to the aperture stop 0 has a positive refracting power and is a glass material. For example, in the present embodiment, the fourth lens element 4 adjacent to the aperture stop 0 has a positive refracting power and is a glass material, but the invention is not limited thereto. Moreover, in the present embodiment, a material of the first lens element 1 is a glass material, and materials of the second lens element 2, the third lens element 3, the fifth lens element 5 and the sixth lens element 6 are plastic materials, but the invention is not limited thereto.

The first lens element 1 has negative refracting power, the object-side surface 11 of the first lens element 1 is a convex surface, and has a convex portion 111 in a vicinity of the optical axis I and a convex portion 112 in a vicinity of a periphery of the first lens element 1. The image-side surface 12 of the first lens element 1 is a concave surface, and has a concave portion 121 in a vicinity of the optical axis I and a concave portion 122 in a vicinity of a periphery of the first lens element 1. In the present embodiment, the object-side surface 11 and the image-side surface 12 of the first lens element 1 are both spherical surfaces.

The second lens element 2 has negative refracting power, the object-side surface 21 of the second lens element 2 is a convex surface, and has a convex portion 211 in a vicinity of the optical axis I and a convex portion 212 in a vicinity of a periphery of the second lens element 2. The image-side surface 22 of the second lens element 2 is a concave surface, and has a concave portion 221 in a vicinity of the optical axis I and a concave portion 222 in a vicinity of a periphery of the second lens element 2. In the present embodiment, the object-side surface 21 and the image-side surface 22 of the second lens element 2 are both aspheric surfaces.

The third lens element 3 is a first lens having a refracting power and sequentially counted from the aperture stop 0 toward the object side. The third lens element 3 has positive refracting power. The object-side surface 31 of the third lens element 3 is a concave surface, and has a concave portion 311 in a vicinity of the optical axis I and a concave portion 312 in a vicinity of a periphery of the third lens element 3. The image-side surface 32 of the third lens element 3 is a convex surface, and has a convex portion 321 in a vicinity of the optical axis I and a convex portion 322 in a vicinity of a periphery of the third lens element 3. In the present embodiment, the object-side surface 31 and the image-side surface 32 of the third lens element 3 are both aspheric surfaces.

The fourth lens element 4 is a first lens having a refracting power and sequentially counted from the aperture stop 0 toward the image side. The fourth lens element 4 has positive refracting power. The object-side surface 41 of the fourth lens element 4 is a flat surface, and has a flat portion 411 in a vicinity of the optical axis I and a flat portion 412 in a vicinity of a periphery of the fourth lens element 4. The image-side surface 42 of the fourth lens element 4 is a convex surface, and has a convex portion 421 in a vicinity of the optical axis I and a convex portion 422 in a vicinity of a periphery of the fourth lens element 4. In the present embodiment, the object-side surface 41 and the image-side surface 42 of the fourth lens element 4 are both spherical surfaces.

The fifth lens element 5 is a second lens having a refracting power and sequentially counted from the image side toward the object side. The fifth lens element 5 has positive refracting power. The object-side surface 51 of the fifth lens element 5 has a convex portion 511 in a vicinity of the optical axis I and a convex portion 512 in a vicinity of a periphery of the fifth lens element 5. The image-side surface 52 of the fifth lens element 5 has a convex portion 521 in a vicinity of the optical axis I and a concave portion 522 in a vicinity of a periphery of the fifth lens element 5. In the present embodiment, the object-side surface 51 and the image-side surface 52 of the fifth lens element 5 are both aspheric surfaces.

The sixth lens element 6 is a first lens having a refracting power and sequentially counted from the image side toward the object side. The sixth lens element 6 has positive refracting power. The object-side surface 61 of the sixth lens element 6 has a convex portion 611 in a vicinity of the optical axis I and a convex portion 612 in a vicinity of a periphery of the sixth lens element 6. The image-side surface 62 of the sixth lens element 6 has a convex portion 621 in a vicinity of the optical axis I and a convex portion 622 in a vicinity of a periphery of the sixth lens element 6. In the present embodiment, the object-side surface 61 and the image-side surface 62 of the sixth lens element 6 are both aspheric surfaces.

The light filter 9 is disposed between the image-side surface 62 of the sixth lens element 6 and the image plane 100. In the present embodiment, the light filter 9 is, for example, an infrared (IR) cut filter, which is used for preventing an IR ray in a part of the IR band in the light from being transmitted to the image plane 100 to influence imaging quality.

The optical imaging lens 10 of the first embodiment has a good performance of athermalization. For example, a focal shift of the optical imaging lens 10 is 0 mm at 20° C., and a focal shift of the optical imaging lens 10 is −0.002 mm at 50° C., but the invention is not limited thereto.

Other detailed optical data of the first embodiment is shown in FIG. 8, and an effective focal length (EFL) of the whole system of the first embodiment is 2.054 mm, a half field of view (HFOV) thereof is 59.854°, an f-number (Fno) thereof is 2.482, and a system length thereof is 18.000 mm. The system length refers to a distance between the object-side surface 11 of the first lens element 1 and the image plane 100 on the optical axis I.

Moreover, the object-side surfaces 21, 31, 51 and 61 and the image-side surfaces 22, 32, 52 and 62 of the second lens element 2, the third lens element 3, the fifth lens element 5, and the sixth lens element 6 are all aspheric surfaces in this embodiment, and the aspheric surfaces are defined by the following equations:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Where:
Y: a distance between a point on an aspheric curve and the optical axis I;
Z: a depth of the aspheric surface (a perpendicular distance between the point on the aspheric surface that is spaced by the distance Y from the optical axis I and a tangent plane tangent to a vertex of the aspheric surface on the optical axis I);
R: a radius of curvature of the surface of the lens element close to the optical axis I;
K: a conic constant;
$a_i$: $i^{th}$ aspheric coefficient.

Various aspheric coefficients of the object-side surfaces 21, 31, 51 and 61 and the image-side surfaces 22, 32, 52 and 62 in the equation (1) are shown in FIG. 9. In FIG. 9, a field referential number 21 represents the aspheric coefficients of the object-side surface 21 of the second lens element 2, and the other fields are deduced by analogy.

Moreover, relationships between various important parameters of the optical imaging lens 10 are shown in one figure of FIG. 42 to FIG. 45 (for example, FIG. 42).

Where,
T1 is a thickness of the first lens element 1 on the optical axis I;
T2 is a thickness of the second lens element 2 on the optical axis I;

T3 is a thickness of the third lens element 3 on the optical axis I;

T4 is a thickness of the fourth lens element 4 on the optical axis I;

T5 is a thickness of the fifth lens element 5 on the optical axis I;

T6 is a thickness of the sixth lens element 6 on the optical axis I;

T7 is a thickness of the seventh lens element 7 on the optical axis I;

T8 is a thickness of the eighth lens element 8 on the optical axis I;

TF is a thickness of the light filter 9 on the optical axis I;

G12 is a distance between the image-side surface 12 of the first lens element 1 and the object-side surface 21 of the second lens element 2 on the optical axis I;

G23 is a distance between the image-side surface 22 of the second lens element 2 and the object-side surface 31 of the third lens element 3 on the optical axis I;

G34 is a distance between the image-side surface 32 of the third lens element 3 and the object-side surface 41 of the fourth lens element 4 on the optical axis I;

G45 is a distance between the image-side surface 42 of the fourth lens element 4 and the object-side surface 51 of the fifth lens element 5 on the optical axis I;

G56 is a distance between the image-side surface 52 of the fifth lens element 5 and the object-side surface 61 of the sixth lens element 6 on the optical axis I;

G47 is a distance between the image-side surface 42 of the fourth lens element 4 and the object-side surface 71 of the seventh lens element 7 on the optical axis I;

G75 is a distance between the image-side surface 72 of the seventh lens element 7 and the object-side surface 51 of the fifth lens element 5 on the optical axis I;

G28 is a distance between the image-side surface 22 of the second lens element 2 and the object-side surface 81 of the eighth lens element 8 on the optical axis I;

G83 is a distance between the image-side surface 82 of the eighth lens element 8 and the object-side surface 31 of the third lens element 3 on the optical axis I;

G6F is a distance between the image-side surface 62 of the sixth lens element 6 and the object-side surface 91 of the light filter 9 on the optical axis I;

GPF is a distance between the image-side surface 92 of the light filter 9 and the image plane 100 on the optical axis I;

ALT is a sum of center thicknesses of all lens elements between the object side and the image side on the optical axis I (for example, in the first embodiment, ALT is a sum of T1, T2, T3, T4, T5 and T6);

AGG is a sum of air gaps between the first lens element 1 and the sixth lens element 6 on the optical axis I (for example, in the first embodiment, AGG is a sum of G12, G23, G34, G45 and G56);

BFL is a distance between the image-side surface 62 of the sixth lens element 6 and the image plane 100 on the optical axis I;

TTL is a distance between the object-side surface 11 of the first lens element 1 and the image plane 100 on the optical axis I;

TL is a distance between the object-side surface 11 of the first lens element 1 and the image-side surface 62 of the sixth lens element 6 on the optical axis I.

Figure 7A:
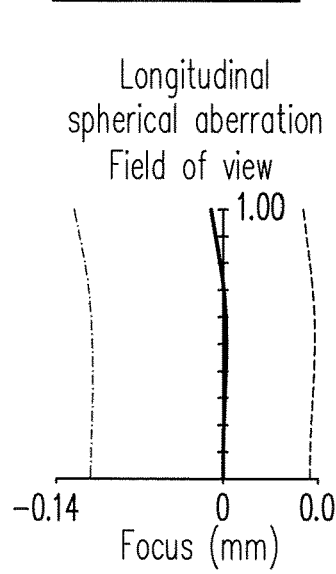
FIG. 7A-FIG. 7D are diagrams of a longitudinal spherical aberration and various aberrations of the optical imaging lens of the first embodiment.
Figure 7B:
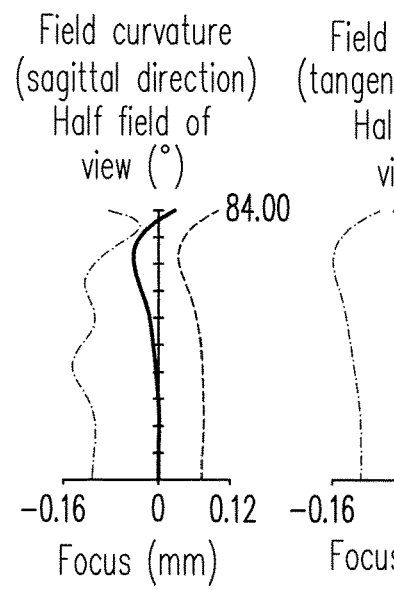
Figure 7C:
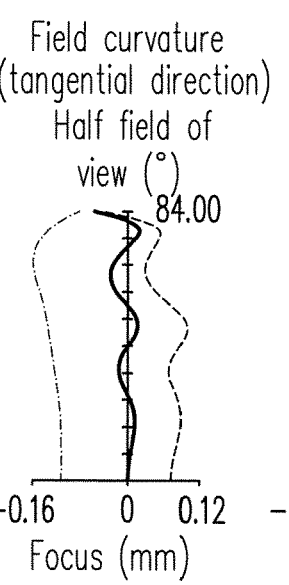
Figure 7D:
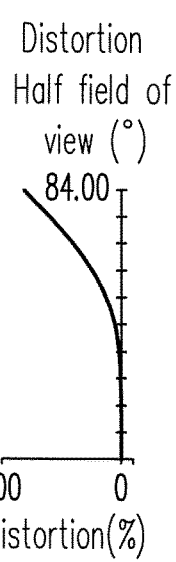

Referring to FIG. 7A to FIG. 7D, FIG. 7A illustrates a longitudinal spherical aberration in a case in which a pupil radius is 0.4278 mm of the optical imaging lens 10 according to the first embodiment, FIG. 7B and FIG. 7C respectively illustrate a field curvature aberration in a sagittal direction on the image plane 100 and a field curvature aberration in a tangential direction on the image plane 100, and FIG. 7D illustrates a distortion aberration on the image plane 100 of the first embodiment. In the diagram of the longitudinal spherical aberration of the first embodiment of FIG. 7A, curves formed by each wavelength are close to each other and are gathered in the middle, which represents that off-axis lights of different heights of each wavelength are gathered around imaging points, and according to a deviation range of the curve of each wavelength, it is learned that deviations of the imaging points of the off-axis lights of different heights are controlled within a range of −0.14 to 0.08 mm, so that the longitudinal spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated.

In the diagrams of the two field curvature aberrations of FIG. 7B and FIG. 7C, a focal length variation of the three representative wavelengths in the whole field of view falls within a range of −0.16 to 0.12 mm, which represents that the optical system of the first embodiment may effectively eliminate the aberration. The diagram of the distortion aberration of FIG. 7D shows that the distortion aberration of the first embodiment is maintained within a range of −100 to 0%, which represents that the distortion aberration of the first embodiment is complied with an imaging quality requirement of the optical system. Compared to the existing optical lenses, the optical imaging lens 10 of the first embodiment of the invention provide good imaging quality. Therefore, under the condition of maintaining a good optical performance, the lens length is reduced and a capturing angle is expanded to implement product designs of thinning tendency and an enlarged field of view (FOV).

FIG. 10 is a schematic diagram of an optical imaging lens according to a second embodiment of the invention, and FIG. 11A to FIG. 11D are diagrams illustrating a longitudinal spherical aberration and various aberrations of the optical imaging lens of the second embodiment.

Referring to FIG. 10, the optical imaging lens 10 of the second embodiment further includes a first lens element 1, a second lens element 2, a third lens element 3, an aperture stop 0, a fourth lens element 4, a seventh lens element 7, a fifth lens element 5, a sixth lens element 6 and a light filter 9 arranged in a sequence from an object side to an image side along an optical axis I. When a light emitted by an object to be captured enters the optical imaging lens 10, after the light passes through the first lens element 1, the second lens element 2, the third lens element 3, the aperture stop 0, the fourth lens element 4, the seventh lens element 7, the fifth lens element 5, the sixth lens element 6 and the light filter 9, an image is formed on an image plane 100.

The first lens element 1, the second lens element 2, the third lens element 3, the fourth lens element 4, the seventh lens element 7, the fifth lens element 5, the sixth lens element 6 and the light filter 9 respectively have object-side surfaces 11, 21, 31, 41, 71, 51, 61, 91 facing toward the object side and pervious to imaging rays and image-side surfaces 12, 22, 32, 42, 72, 52, 62, 92 facing toward the image side and pervious to the imaging rays.

In order to achieve a good performance of athermalization and good imaging quality, at least one lens element adjacent to the aperture stop 0 has a positive refracting power and is a glass material. For example, in the present embodiment, the fourth lens element 4 adjacent to the aperture stop 0 has a positive refracting power and is a glass material, but the invention is not limited thereto. Moreover, in the present embodiment, a material of the first lens element 1 is a glass material, and materials of the second lens element 2, the third lens element 3, the seventh lens element 7, the fifth lens element 5 and the sixth lens element 6 are plastic materials, but the invention is not limited thereto.

The first lens element 1 has negative refracting power, the object-side surface 11 of the first lens element 1 is a convex surface, and has a convex portion 111 in a vicinity of the optical axis I and a convex portion 112 in a vicinity of a periphery of the first lens element 1. The image-side surface 12 of the first lens element 1 is a concave surface, and has a concave portion 121 in a vicinity of the optical axis I and a concave portion 122 in a vicinity of a periphery of the first lens element 1. In the present embodiment, the object-side surface 11 and the image-side surface 12 of the first lens element 1 are both spherical surfaces.

The second lens element 2 has negative refracting power, the object-side surface 21 of the second lens element 2 is a convex surface, and has a convex portion 211 in a vicinity of the optical axis I and a convex portion 212 in a vicinity of a periphery of the second lens element 2. The image-side surface 22 of the second lens element 2 is a concave surface, and has a concave portion 221 in a vicinity of the optical axis I and a concave portion 222 in a vicinity of a periphery of the second lens element 2. In the present embodiment, the object-side surface 21 and the image-side surface 22 of the second lens element 2 are both aspheric surfaces.

The third lens element 3 is a first lens having a refracting power and sequentially counted from the aperture stop 0 toward the object side. The third lens element 3 has positive refracting power. The object-side surface 31 of the third lens element 3 has a convex portion 313 in a vicinity of the optical axis I and a convex portion 314 in a vicinity of a periphery of the third lens element 3. The image-side surface 32 of the third lens element 3 is a convex surface, and has a convex portion 321 in a vicinity of the optical axis I and a convex portion 322 in a vicinity of a periphery of the third lens element 3. In the present embodiment, the object-side surface 31 and the image-side surface 32 of the third lens element 3 are both aspheric surfaces.

The fourth lens element 4 is a first lens having a refracting power and sequentially counted from the aperture stop 0 toward the image side. The fourth lens element 4 has positive refracting power. The object-side surface 41 of the fourth lens element 4 is a flat surface, and has a flat portion 411 in a vicinity of the optical axis I and a flat portion 412 in a vicinity of a periphery of the fourth lens element 4. The image-side surface 42 of the fourth lens element 4 is a convex surface, and has a convex portion 421 in a vicinity of the optical axis I and a convex portion 422 in a vicinity of a periphery of the fourth lens element 4. In the present embodiment, the object-side surface 41 and the image-side surface 42 of the fourth lens element 4 are both spherical surfaces.

The seventh lens element 7 is the third lens having a refracting power and sequentially counted from the image side toward the object side. The seventh lens element 7 has negative refracting power. The object-side surface 71 of the seventh lens element 7 has a concave portion 711 in a vicinity of the optical axis I and a concave portion 712 in a vicinity of a periphery of the seventh lens element 7. The image-side surface 72 of the seventh lens element 7 has a convex portion 721 in a vicinity of the optical axis I and a concave portion 722 in a vicinity of a periphery of the seventh lens element 7. In the present embodiment, the object-side surface 71 and the image-side surface 72 of the seventh lens element 7 are both aspheric surfaces.

The fifth lens element 5 is a second lens having a refracting power and sequentially counted from the image side toward the object side. The fifth lens element 5 has positive refracting power. The object-side surface 51 of the fifth lens element 5 has a concave portion 513 in a vicinity of the optical axis I and a convex portion 512 in a vicinity of a periphery of the fifth lens element 5. The image-side surface 52 of the fifth lens element 5 has a convex portion 521 in a vicinity of the optical axis I and a convex portion 523 in a vicinity of a periphery of the fifth lens element 5. In the present embodiment, the object-side surface 51 and the image-side surface 52 of the fifth lens element 5 are both aspheric surfaces.

The seventh lens element 7 and the fifth lens element 5 form a cemented lens, e.g. a double cemented lens. The image-side surface 72 of the seventh lens element 7 coincides with the object-side surface 51 of the fifth lens element 5. The object-side surface 51 of the fifth lens element 5 is a surface connecting the seventh lens element 7 and the fifth lens element 5. The cemented lens formed by the seventh lens element 7 and the fifth lens element 5 plays a role like the fifth lens element 5 of the first embodiment. In the present embodiment, an Abbe number of the seventh lens element 7 and an Abbe number of the fifth lens element 5 are different, so as to ameliorate a chromatic aberration and achieve a good imaging quality.

The sixth lens element 6 is a first lens having a refracting power and sequentially counted from the image side toward the object side. The sixth lens element 6 has positive refracting power. The object-side surface 61 of the sixth lens element 6 has a convex portion 611 in a vicinity of the optical axis I and a concave portion 613 in a vicinity of a periphery of the sixth lens element 6. The image-side surface 62 of the sixth lens element 6 has a convex portion 621 in a vicinity of the optical axis I and a convex portion 622 in a vicinity of a periphery of the sixth lens element 6. In the present embodiment, the object-side surface 61 and the image-side surface 62 of the sixth lens element 6 are both aspheric surfaces.

Detailed optical data of the optical imaging lens 10 is shown in FIG. 12, and an effective focal length (EFL) of the whole system of the second embodiment is 2.360 mm, a half field of view (HFOV) thereof is 63.818°, an f-number (Fno) thereof is 2.450, and a system length thereof is 20.644 mm.

FIG. 13 illustrates various aspheric coefficients of the object-side surface 11 of the first lens element 1 to the image-side surface 62 of the sixth lens element 6 in the equation (1) in the second embodiment.

Moreover, relationships between various important parameters of the optical imaging lens 10 of the second embodiment are shown in FIG. 43.

According to the longitudinal spherical aberration diagram of FIG. 11A of the second embodiment, a deviation of the imaging points of the off-axis lights of different heights is controlled within a range of ±0.06 mm. According to the two field curvature aberration diagrams of FIG. 11B and FIG. 11C, a focal length variation of the three representative wavelengths in the whole field of view falls within ±0.16 mm. According to the distortion aberration diagram of FIG. 11D, a distortion aberration of the second embodiment is maintained within the range of ±100%. In the present embodiment, a focal shift of the optical imaging lens 10 is 0 mm at 20° C., and a focal shift of the optical imaging lens 10 is 0.003 mm at 50° C. Therefore, it is known that compared to the existing optical lens, the second embodiment may also achieve the good optical performance under a condition that the optical imaging lens has a good performance of athermalization.

According to the above description, it is learned that compared to the first embodiment, the advantages of the second embodiment are that the f-number of the second embodiment is greater than the f-number of the first embodiment, the half field of view of the second embodiment is greater than the half field of view of the first embodiment, and the field curvature aberration in a sagittal direction of the second embodiment is smaller than the field curvature aberration in a sagittal direction of the first embodiment.

FIG. 14 is a schematic diagram of an optical imaging lens according to a third embodiment of the invention, and FIG. 15A to FIG. 15D are diagrams illustrating a longitudinal spherical aberration and various aberrations of the optical imaging lens of the third embodiment.

Referring to FIG. 14, the optical imaging lens 10 of the third embodiment of the invention sequentially includes a first lens element 1, a second lens element 2, an eighth lens element 8, a third lens element 3, an aperture stop 0, a fourth lens element 4, a fifth lens element 5, a sixth lens element 6 and a light filter 9 arranged in a sequence from an object side to an image side along an optical axis I. When a light emitted by an object to be captured enters the optical imaging lens 10, after the light passes through the first lens element 1, the second lens element 2, the eighth lens element 8, the third lens element 3, the aperture stop 0, the fourth lens element 4, the fifth lens element 5, the sixth lens element 6 and the light filter 9, an image is formed on an image plane 100.

The first lens element 1, the second lens element 2, the eighth lens element 8, the third lens element 3, the fourth lens element 4, the fifth lens element 5, the sixth lens element 6 and the light filter 9 respectively have object-side surfaces 11, 21, 81, 31, 41, 51, 61, 91 facing toward the object side and pervious to imaging rays and image-side surfaces 12, 22, 82, 32, 42, 52, 62, 92 facing toward the image side and pervious to the imaging rays.

In order to achieve a good performance of athermalization and good imaging quality, at least one lens element adjacent to the aperture stop 0 has a positive refracting power and is a glass material. For example, in the present embodiment, the fourth lens element 4 adjacent to the aperture stop 0 has a positive refracting power and is a glass material, but the invention is not limited thereto. Moreover, in the present embodiment, a material of the first lens element 1 is a glass material, and materials of the second lens element 2, the eighth lens element 8, the third lens element 3, the fifth lens element 5 and the sixth lens element 6 are plastic materials, but the invention is not limited thereto.

The first lens element 1 has negative refracting power, the object-side surface 11 of the first lens element 1 is a convex surface, and has a convex portion 111 in a vicinity of the optical axis I and a convex portion 112 in a vicinity of a periphery of the first lens element 1. The image-side surface 12 of the first lens element 1 is a concave surface, and has a concave portion 121 in a vicinity of the optical axis I and a concave portion 122 in a vicinity of a periphery of the first lens element 1. In the present embodiment, the object-side surface 11 and the image-side surface 12 of the first lens element 1 are both spherical surfaces.

The second lens element 2 has negative refracting power, the object-side surface 21 of the second lens element 2 is a convex surface, and has a convex portion 211 in a vicinity of the optical axis I and a concave portion 213 in a vicinity of a periphery of the second lens element 2. The image-side surface 22 of the second lens element 2 is a concave surface, and has a concave portion 221 in a vicinity of the optical axis I and a concave portion 222 in a vicinity of a periphery of the second lens element 2. In the present embodiment, the object-side surface 21 and the image-side surface 22 of the second lens element 2 are both aspheric surfaces.

The eighth lens element 8 is the second lens having a refracting power and sequentially counted from an aperture stop 0 toward the object side. The eighth lens element 8 has positive refracting power. The object-side surface 81 of the eighth lens element 8 has a concave portion 811 in a vicinity of the optical axis I and a convex portion 812 in a vicinity of a periphery of the eighth lens element 8. The image-side surface 82 of the eighth lens element 8 has a convex portion 821 in a vicinity of the optical axis I and a convex portion 822 in a vicinity of a periphery of the eighth lens element 8. In the present embodiment, the object-side surface 81 and the image-side surface 82 of the eighth lens element 8 are both aspheric surfaces.

The third lens element 3 is a first lens having a refracting power and sequentially counted from the aperture stop 0 toward the object side. The third lens element 3 has positive refracting power. The object-side surface 31 of the third lens element 3 is a concave surface, and has a concave portion 311 in a vicinity of the optical axis I and a concave portion 312 in a vicinity of a periphery of the third lens element 3. The image-side surface 32 of the third lens element 3 is a convex surface, and has a convex portion 321 in a vicinity of the optical axis I and a convex portion 322 in a vicinity of a periphery of the third lens element 3. In the present embodiment, the object-side surface 31 and the image-side surface 32 of the third lens element 3 are both aspheric surfaces.

The fourth lens element 4 is a first lens having a refracting power and sequentially counted from the aperture stop 0 toward the image side. The fourth lens element 4 has positive refracting power. The object-side surface 41 of the fourth lens element 4 is a flat surface, and has a flat portion 411 in a vicinity of the optical axis I and a flat portion 412 in a vicinity of a periphery of the fourth lens element 4. The image-side surface 42 of the fourth lens element 4 is a convex surface, and has a convex portion 421 in a vicinity of the optical axis I and a convex portion 422 in a vicinity of a periphery of the fourth lens element 4. In the present embodiment, the object-side surface 41 and the image-side surface 42 of the fourth lens element 4 are both spherical surfaces.

The fifth lens element 5 is a second lens having a refracting power and sequentially counted from the image side toward the object side. The fifth lens element 5 has positive refracting power. The object-side surface 51 of the fifth lens element 5 has a convex portion 511 in a vicinity of the optical axis I and a convex portion 512 in a vicinity of a periphery of the fifth lens element 5. The image-side surface 52 of the fifth lens element 5 has a convex portion 521 in a vicinity of the optical axis I and a concave portion 522 in a vicinity of a periphery of the fifth lens element 5. In the present embodiment, the object-side surface 51 and the image-side surface 52 of the fifth lens element 5 are both aspheric surfaces.

The sixth lens element 6 is a first lens having a refracting power and sequentially counted from the image side toward the object side. The sixth lens element 6 has positive refracting power. The object-side surface 61 of the sixth lens element 6 has a convex portion 611 in a vicinity of the optical axis I and a convex portion 612 in a vicinity of a periphery of the sixth lens element 6. The image-side surface 62 of the sixth lens element 6 has a convex portion 621 in a vicinity of the optical axis I and a convex portion 622 in a vicinity of a periphery of the sixth lens element 6. In the present embodiment, the object-side surface 61 and the image-side surface 62 of the sixth lens element 6 are both aspheric surfaces.

Detailed optical data of the optical imaging lens 10 is shown in FIG. 16, and an effective focal length (EFL) of the whole system of the second embodiment is 1.857 mm, a half field of view (HFOV) thereof is 51.467°, an f-number (Fno) thereof is 2.439, and a system length thereof is 18.625 mm.

FIG. 17 illustrates various aspheric coefficients of the object-side surface 11 of the first lens element 1 to the image-side surface 62 of the sixth lens element 6 in the equation (1) in the third embodiment.

Moreover, relationships between various important parameters of the optical imaging lens 10 of the third embodiment are shown in FIG. 44.

According to the longitudinal spherical aberration diagram of FIG. 15A of the third embodiment, a deviation of the imaging points of the off-axis lights of different heights is controlled within a range of ±0.12 mm. According to the two field curvature aberration diagrams of FIG. 15B and FIG. 15C, a focal length variation of the three representative wavelengths in the whole field of view falls within ±0.40 mm. According to the distortion aberration diagram of FIG. 15D, a distortion aberration of the second embodiment is maintained within the range of ±100%. In the present embodiment, a focal shift of the optical imaging lens 10 is 0 mm at 20° C., and a focal shift of the optical imaging lens 10 is 0.001 mm at 50° C. Therefore, it is known that compared to the existing optical lens, the third embodiment may also achieve the good optical performance under a condition that the optical imaging lens has a good performance of athermalization.

According to the above description, it is learned that compared to the first embodiment, the advantages of the third embodiment are that the longitudinal spherical aberration of the third embodiment is smaller than the longitudinal spherical aberration of the first embodiment. Besides, because a thickness difference between portions in a vicinity of the optical axis and in a vicinity of a periphery of the first lens element 1 in the third embodiment is less than that of the first embodiment, the optical imaging lens in the third embodiment is, in comparison with that provided in the first embodiment, easier to be manufactured and thus has higher yield.

FIG. 18 is a schematic diagram of an optical imaging lens according to a fourth embodiment of the invention, and FIG. 19A to FIG. 19D are diagrams illustrating a longitudinal spherical aberration and various aberrations of the optical imaging lens of the fourth embodiment.

Referring to FIG. 18, the optical imaging lens 10 of the fourth embodiment of the invention sequentially includes a first lens element 1, a second lens element 2, an eighth lens element 8, a third lens element 3, an aperture stop 0, a fourth lens element 4, a seventh lens element 7, a fifth lens element 5, a sixth lens element 6 and a light filter 9 arranged in a sequence from an object side to an image side along an optical axis I. When a light emitted by an object to be captured enters the optical imaging lens 10, after the light passes through the first lens element 1, the second lens element 2, the eighth lens element 8, the third lens element 3, the aperture stop 0, the fourth lens element 4, the seventh lens element 7, the fifth lens element 5, the sixth lens element 6 and the light filter 9, an image is formed on an image plane 100.

The first lens element 1, the second lens element 2, the eighth lens element 8, the third lens element 3, the fourth lens element 4, the seventh lens element 7, the fifth lens element 5, the sixth lens element 6 and the light filter 9 respectively have object-side surfaces 11, 21, 81, 31, 41, 71, 51, 61, 91 facing toward the object side and pervious to imaging rays and image-side surfaces 12, 22, 82, 32, 42, 72, 52, 62, 92 facing toward the image side and pervious to the imaging rays.

In order to achieve a good performance of athermalization and good imaging quality, at least one lens element adjacent to the aperture stop 0 has a positive refracting power and is a glass material. For example, in the present embodiment, the fourth lens element 4 adjacent to the aperture stop 0 has a positive refracting power and is a glass material, but the invention is not limited thereto. Moreover, in the present embodiment, a material of the first lens element 1 is a glass material, and materials of the second lens element 2, the eighth lens element 8, the third lens element 3, the seventh lens element 7, the fifth lens element 5 and the sixth lens element 6 are plastic materials, but the invention is not limited thereto.

The first lens element 1 has negative refracting power, the object-side surface 11 of the first lens element 1 is a convex surface, and has a convex portion 111 in a vicinity of the optical axis I and a convex portion 112 in a vicinity of a periphery of the first lens element 1. The image-side surface 12 of the first lens element 1 is a concave surface, and has a concave portion 121 in a vicinity of the optical axis I and a concave portion 122 in a vicinity of a periphery of the first lens element 1. In the present embodiment, the object-side surface 11 and the image-side surface 12 of the first lens element 1 are both spherical surfaces.

The second lens element 2 has negative refracting power, the object-side surface 21 of the second lens element 2 has a convex portion 211 in a vicinity of the optical axis I and a concave portion 213 in a vicinity of a periphery of the second lens element 2. The image-side surface 22 of the second lens element 2 is a concave surface, and has a concave portion 221 in a vicinity of the optical axis I and a concave portion 222 in a vicinity of a periphery of the second lens element 2. In the present embodiment, the object-side surface 21 and the image-side surface 22 of the second lens element 2 are both aspheric surfaces.

The eighth lens element 8 is the second lens having a refracting power and sequentially counted from an aperture stop 0 toward the object side. The eighth lens element 8 has positive refracting power. The object-side surface 81 of the eighth lens element 8 has a concave portion 811 in a vicinity of the optical axis I and a convex portion 812 in a vicinity of a periphery of the eighth lens element 8. The image-side surface 82 of the eighth lens element 8 has a convex portion 821 in a vicinity of the optical axis I and a convex portion 822 in a vicinity of a periphery of the eighth lens element 8. In the present embodiment, the object-side surface 81 and the image-side surface 82 of the eighth lens element 8 are both aspheric surfaces.

The third lens element 3 is a first lens having a refracting power and sequentially counted from the aperture stop 0 toward the object side. The third lens element 3 has positive refracting power. The object-side surface 31 of the third lens element 3 is a concave surface, and has a concave portion 311 in a vicinity of the optical axis I and a concave portion 312 in a vicinity of a periphery of the third lens element 3. The image-side surface 32 of the third lens element 3 is a convex surface, and has a convex portion 321 in a vicinity of the optical axis I and a convex portion 322 in a vicinity of a periphery of the third lens element 3. In the present embodiment, the object-side surface 31 and the image-side surface 32 of the third lens element 3 are both aspheric surfaces. The eighth lens element 8 and the third lens element 3 play a role like the third lens element 3 of the first embodiment.

The fourth lens element 4 is a first lens having a refracting power and sequentially counted from the aperture stop 0 toward the image side. The fourth lens element 4 has positive refracting power. The object-side surface 41 of the fourth lens element 4 is a flat surface, and has a flat portion 411 in a vicinity of the optical axis I and a flat portion 412 in a vicinity of a periphery of the fourth lens element 4. The image-side surface 42 of the fourth lens element 4 is a convex surface, and has a convex portion 421 in a vicinity of the optical axis I and a convex portion 422 in a vicinity of a periphery of the fourth lens element 4. In the present embodiment, the object-side surface 41 and the image-side surface 42 of the fourth lens element 4 are both spherical surfaces.

The seventh lens element 7 is the third lens having a refracting power and sequentially counted from the image side toward the object side. The seventh lens element 7 has negative refracting power. The object-side surface 71 of the seventh lens element 7 has a concave portion 711 in a vicinity of the optical axis I and a concave portion 712 in a vicinity of a periphery of the seventh lens element 7. The image-side surface 72 of the seventh lens element 7 has a concave portion 723 in a vicinity of the optical axis I and a concave portion 722 in a vicinity of a periphery of the seventh lens element 7. In the present embodiment, the object-side surface 71 and the image-side surface 72 of the seventh lens element 7 are both aspheric surfaces.

The fifth lens element 5 is a second lens having a refracting power and sequentially counted from the image side toward the object side. The fifth lens element 5 has positive refracting power. The object-side surface 51 of the fifth lens element 5 has a convex portion 511 in a vicinity of the optical axis I and a convex portion 512 in a vicinity of a periphery of the fifth lens element 5. The image-side surface 52 of the fifth lens element 5 has a convex portion 521 in a vicinity of the optical axis I and a convex portion 523 in a vicinity of a periphery of the fifth lens element 5. In the present embodiment, the object-side surface 51 and the image-side surface 52 of the fifth lens element 5 are both aspheric surfaces.

The sixth lens element 6 is a first lens having a refracting power and sequentially counted from the image side toward the object side. The sixth lens element 6 has positive refracting power. The object-side surface 61 of the sixth lens element 6 has a convex portion 611 in a vicinity of the optical axis I and a concave portion 613 in a vicinity of a periphery of the sixth lens element 6. The image-side surface 62 of the sixth lens element 6 has a concave portion 624 in a vicinity of the optical axis I and a concave portion 623 in a vicinity of a periphery of the sixth lens element 6. In the present embodiment, the object-side surface 61 and the image-side surface 62 of the sixth lens element 6 are both aspheric surfaces.

Detailed optical data of the optical imaging lens 10 is shown in FIG. 20, and an effective focal length (EFL) of the whole system of the second embodiment is 2.360 mm, a half field of view (HFOV) thereof is 60.148°, an f-number (Fno) thereof is 2.473, and a system length thereof is 22.413 mm.

FIG. 21 illustrates various aspheric coefficients of the object-side surface 11 of the first lens element 1 to the image-side surface 62 of the sixth lens element 6 in the equation (1) in the fourth embodiment.

Moreover, relationships between various important parameters of the optical imaging lens 10 of the fourth embodiment are shown in FIG. 45.

According to the longitudinal spherical aberration diagram of FIG. 19A of the fourth embodiment, a deviation of the imaging points of the off-axis lights of different heights is controlled within a range of ±0.04 mm. According to the two field curvature aberration diagrams of FIG. 19B and FIG. 19C, a focal length variation of the three representative wavelengths in the whole field of view falls within ±0.05 mm. According to the distortion aberration diagram of FIG. 19D, a distortion aberration of the fourth embodiment is maintained within the range of ±100%. In the present embodiment, a focal shift of the optical imaging lens 10 is 0 mm at 20° C., and a focal shift of the optical imaging lens 10 is 0.012 mm at 50° C. Therefore, it is known that compared to the existing optical lens, the fourth embodiment may also achieve the good optical performance under a condition that the optical imaging lens has a good performance of athermalization.

According to the above description, it is learned that compared to the first embodiment, the advantages of the fourth embodiment are that the longitudinal spherical aberration of the fourth embodiment is smaller than that of the first embodiment, and the field curvature aberration in a sagittal direction and a tangential direction of the fourth embodiment is smaller than those of the first embodiment. Besides, because a thickness difference between portions in a vicinity of the optical axis and in a vicinity of a periphery of the first lens element 1 in the fourth embodiment is less than that of the first embodiment, the optical imaging lens in the fourth embodiment is, in comparison with that provided in the first embodiment, easier to be manufactured and thus has higher yield.

Figure 22:
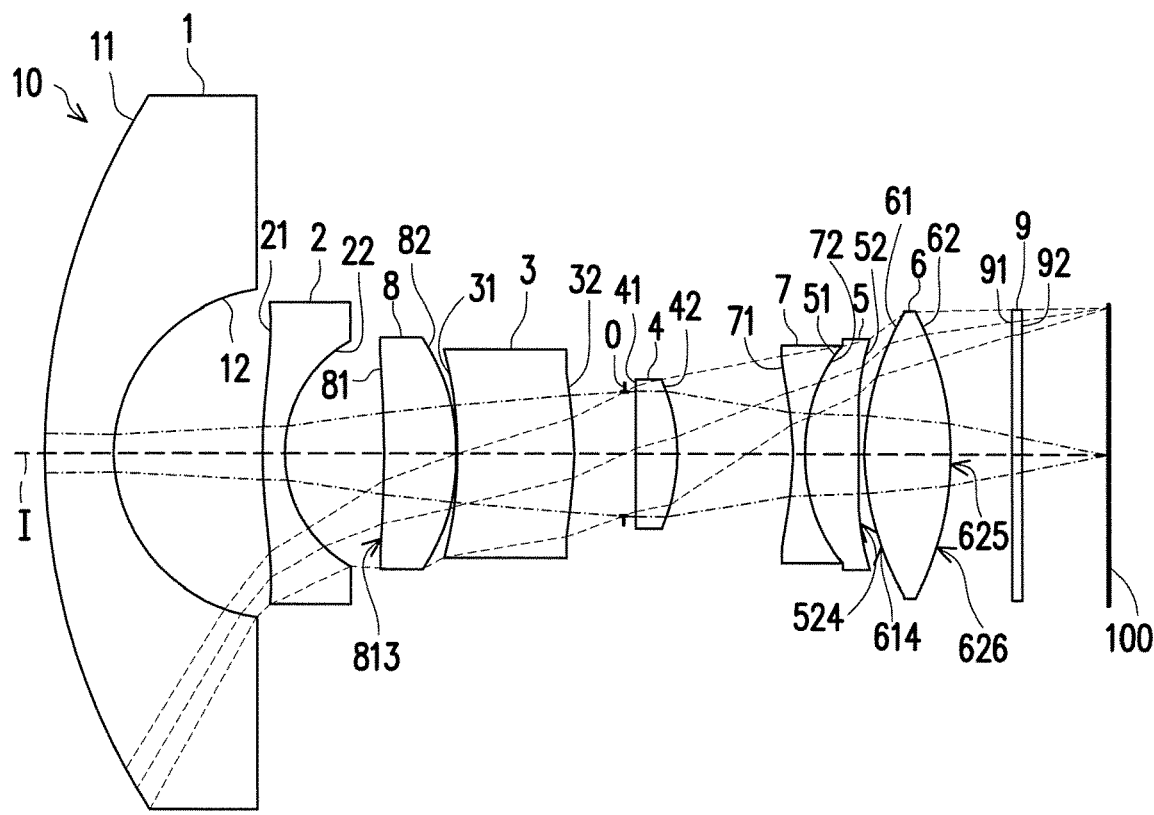
FIG. 22 is a schematic diagram of an optical imaging lens of a fifth embodiment of the invention.

FIG. 22 is a schematic diagram of an optical imaging lens according to a fifth embodiment of the invention, and FIG. 20A to FIG. 20D are diagrams illustrating longitudinal spherical aberrations and various aberrations of the optical imaging lens of the fifth embodiment. Referring to FIG. 22, which is a fifth embodiment of the optical imaging lens 10 of the invention, where the fifth embodiment is similar to the fourth embodiment, and only optical data, aspheric coefficients and parameters among the lens elements 1 to 8 are somewhat different, the object-side surface 81 of the eighth lens element 8 has a concave portion 813 in a vicinity of a periphery of the eighth lens element 8, the fifth lens element 5 has negative refracting power, the image-side surface 52 of the fifth lens element 5 has a concave portion 523 in a vicinity of a periphery of the fifth lens element 5, the object-side surface 61 of the sixth lens element 6 has a convex portion 614 in a vicinity of a periphery of the sixth lens element 6, and the image-side surface 62 of the sixth lens element 6 has a convex portion 625 in a vicinity of the optical axis I and a convex portion 626 in a vicinity of a periphery of the sixth lens element 6. It should be noted that in order to clearly display the figure, a part of the referential numbers of the concave portions and the convex portions that are the same as those of the fourth embodiment are omitted in FIG. 22.

Detailed optical data of the optical imaging lens 10 is shown in FIG. 22, and an effective focal length (EFL) of the whole system of the second embodiment is 2.360 mm, a half field of view (HFOV) thereof is 53.420°, an f-number (Fno) thereof is 2.479, and a system length thereof is 24.591 mm.

FIG. 25 illustrates various aspheric coefficients of the object-side surface 11 of the first lens element 1 to the image-side surface 62 of the sixth lens element 6 in the equation (1) in the fifth embodiment.

Moreover, relationships between various important parameters of the optical imaging lens 10 of the fifth embodiment are shown in FIG. 45.

Figures 23A, 23B, 23C, 23D:
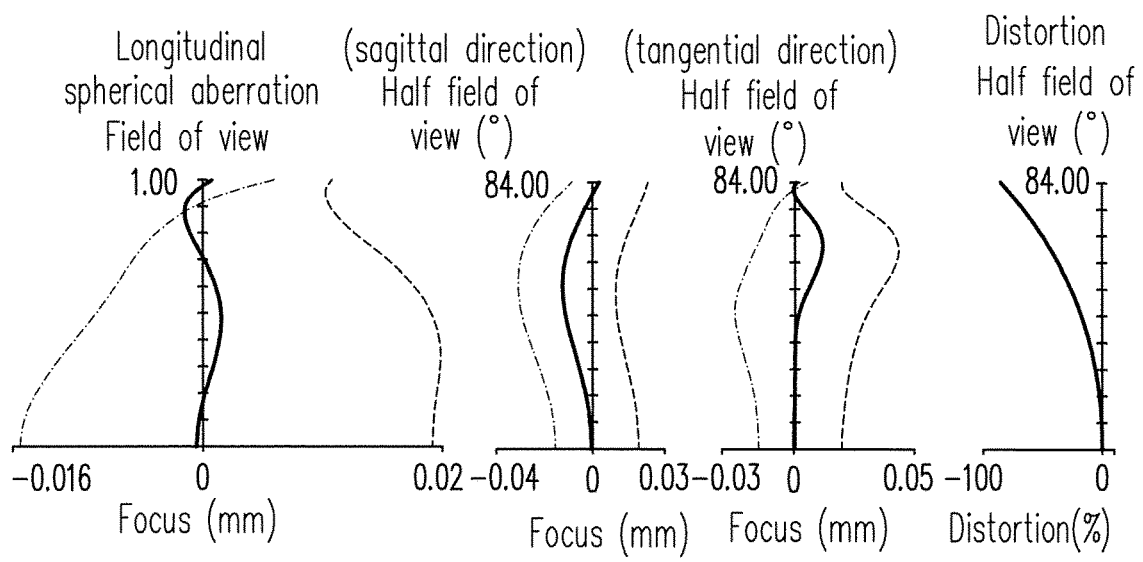
FIG. 23A-FIG. 23D are diagrams of a longitudinal spherical aberration and various aberrations of the optical imaging lens of the fifth embodiment.

According to the longitudinal spherical aberration diagram of FIG. 23A of the fifth embodiment, a deviation of the imaging points of the off-axis lights of different heights is controlled within a range of ±0.02 mm. According to the two field curvature aberration diagrams of FIG. 23B and FIG. 23C, a focal length variation of the three representative wavelengths in the whole field of view falls within ±0.05 mm. According to the distortion aberration diagram of FIG. 23D, a distortion aberration of the fourth embodiment is maintained within the range of ±100%. In the present embodiment, a focal shift of the optical imaging lens 10 is 0 mm at 20° C., and a focal shift of the optical imaging lens 10 is 0.011 mm at 50° C. Therefore, it is known that compared to the existing optical lens, the fifth embodiment may also achieve the good optical performance under a condition that the optical imaging lens has a good performance of athermalization.

According to the above description, it is learned that compared to the fourth embodiment, the advantages of the fifth embodiment are that the f-number of the fifth embodiment is greater than that of the fourth embodiment, the longitudinal spherical aberration of the fifth embodiment is smaller than that of the fourth embodiment, and the field curvature aberration in a tangential direction of the fifth embodiment is smaller than that of the fourth embodiment. Besides, because a thickness difference between portions in a vicinity of the optical axis and in a vicinity of a periphery of the first lens element 1 in the fifth embodiment is less than that of the fourth embodiment, the optical imaging lens in the fifth embodiment is, in comparison with that provided in the fourth embodiment, easier to be manufactured and thus has higher yield.

FIG. 26 is a schematic diagram of an optical imaging lens according to a sixth embodiment of the invention, and FIG. 27A to FIG. 27D are diagrams illustrating a longitudinal spherical aberration and various aberrations of the optical imaging lens of the sixth embodiment. Referring to FIG. 26, which is a sixth embodiment of the optical imaging lens 10 of the invention, where the sixth embodiment is similar to the fourth embodiment, and only optical data, aspheric coefficients and parameters among the lens elements 1 to 8 are somewhat different, the object-side surface 21 of the second lens element 2 has a convex portion 214 in a vicinity of a periphery of the second lens element 2, the object-side surface 61 of the sixth lens element 6 has a convex portion 614 in a vicinity of a periphery of the sixth lens element 6, and the image-side surface 62 of the sixth lens element 6 has a convex portion 625 in a vicinity of the optical axis I and a convex portion 626 in a vicinity of a periphery of the sixth lens element 6. It should be noted that in order to clearly display the figure, a part of the referential numbers of the concave portions and the convex portions that are the same as those of the fourth embodiment are omitted in FIG. 26.

Detailed optical data of the optical imaging lens 10 is shown in FIG. 26, and an effective focal length (EFL) of the whole system of the second embodiment is 2.360 mm, a half field of view (HFOV) thereof is 66.307°, an f-number (Fno) thereof is 2.469, and a system length thereof is 21.717 mm.

FIG. 29 illustrates various aspheric coefficients of the object-side surface 11 of the first lens element 1 to the image-side surface 62 of the sixth lens element 6 in the equation (1) in the sixth embodiment.

Moreover, relationships between various important parameters of the optical imaging lens 10 of the sixth embodiment are shown in FIG. 45.

According to the longitudinal spherical aberration diagram of FIG. 27A of the sixth embodiment, a deviation of the imaging points of the off-axis lights of different heights is controlled within a range of ±0.02 mm. According to the two field curvature aberration diagrams of FIG. 27B and FIG. 27C, a focal length variation of the three representative wavelengths in the whole field of view falls within ±0.05 mm. According to the distortion aberration diagram of FIG. 27D, a distortion aberration of the fourth embodiment is maintained within the range of ±100%. In the present embodiment, a focal shift of the optical imaging lens 10 is 0 mm at 20° C., and a focal shift of the optical imaging lens 10 is 0.003 mm at 50° C. Therefore, it is known that compared to the existing optical lens, the sixth embodiment may also achieve the good optical performance under a condition that the optical imaging lens has a good performance of athermalization.

According to the above description, it is learned that compared to the fourth embodiment, the advantages of the sixth embodiment are that the system length of the sixth embodiment is shorter than that of the fourth embodiment, the half field of view of the sixth embodiment is greater than that of the fourth embodiment, the longitudinal spherical aberration of the sixth embodiment is smaller than that of the fourth embodiment, and the field curvature aberration in a tangential direction of the sixth embodiment is smaller than that of the fourth embodiment. Besides, because a thickness difference between portions in a vicinity of the optical axis and in a vicinity of a periphery of the seventh lens element 7 in the sixth embodiment is less than that of the fourth embodiment, the optical imaging lens in the sixth embodiment is, in comparison with that provided in the fourth embodiment, easier to be manufactured and thus has higher yield.

FIG. 30 is a schematic diagram of an optical imaging lens according to a seventh embodiment of the invention, and FIG. 31A to FIG. 31D are diagrams illustrating a longitudinal spherical aberration and various aberrations of the optical imaging lens of the seventh embodiment. Referring to FIG. 30, which is a seventh embodiment of the optical imaging lens 10 of the invention, where the seventh embodiment is similar to the fourth embodiment, and only optical data, aspheric coefficients and parameters among the lens elements 1 to 8 are somewhat different, the object-side surface 21 of the second lens element 2 has a convex portion 214 in a vicinity of a periphery of the second lens element 2, the object-side surface 81 of the eighth lens element 8 has a convex portion 813 in a vicinity of the optical axis I, the third lens element 3 has negative refracting power, the image-side surface 32 of the third lens element 3 has a concave portion 323 in a vicinity of a periphery of the third lens element 3, the image-side surface 52 of the fifth lens element 5 has a concave portion 513 in a vicinity of a periphery of the fifth lens element 5, and the image-side surface 62 of the sixth lens element 6 has a convex portion 625 in a vicinity of the optical axis I and a convex portion 626 in a vicinity of a periphery of the sixth lens element 6. It should be noted that in order to clearly display the figure, a part of the referential numbers of the concave portions and the convex portions that are the same as those of the fourth embodiment are omitted in FIG. 30.

Detailed optical data of the optical imaging lens 10 is shown in FIG. 31, and an effective focal length (EFL) of the whole system of the second embodiment is 2.359 mm, a half field of view (HFOV) thereof is 67.163°, an f-number (Fno) thereof is 2.470, and a system length thereof is 21.508 mm.

FIG. 33 illustrates various aspheric coefficients of the object-side surface 11 of the first lens element 1 to the image-side surface 62 of the sixth lens element 6 in the equation (1) in the seventh embodiment.

Moreover, relationships between various important parameters of the optical imaging lens 10 of the seventh embodiment are shown in FIG. 45.

According to the longitudinal spherical aberration diagram of FIG. 31A of the seventh embodiment, a deviation of the imaging points of the off-axis lights of different heights is controlled within a range of ±0.05 mm. According to the two field curvature aberration diagrams of FIG. 31B and FIG. 31C, a focal length variation of the three representative wavelengths in the whole field of view falls within ±0.10 mm. According to the distortion aberration diagram of FIG. 31D, a distortion aberration of the fourth embodiment is maintained within the range of ±100%. In the present embodiment, a focal shift of the optical imaging lens 10 is 0 mm at 20° C., and a focal shift of the optical imaging lens 10 is 0.004 mm at 50° C. Therefore, it is known that compared to the existing optical lens, the seventh embodiment may also achieve the good optical performance under a condition that the optical imaging lens has a good performance of athermalization.

According to the above description, it is learned that compared to the fourth embodiment, the advantages of the seventh embodiment are that the system length of the seventh embodiment is shorter than that of the fourth embodiment, and the half field of view of the seventh embodiment is greater than that of the fourth embodiment. Besides, because a thickness difference between portions in a vicinity of the optical axis and in a vicinity of a periphery of the first lens element 1 in the seventh embodiment is less than that of the fourth embodiment, the optical imaging lens in the seventh embodiment is, in comparison with that provided in the fourth embodiment, easier to be manufactured and thus has higher yield.

FIG. 34 is a schematic diagram of an optical imaging lens according to an eighth embodiment of the invention, and FIG. 35A to FIG. 35D are diagrams illustrating longitudinal spherical aberrations and various aberrations of the optical imaging lens of the eighth embodiment. Referring to FIG. 34, which is an eighth embodiment of the optical imaging lens 10 of the invention, where the eighth embodiment is similar to the fourth embodiment, and only optical data, aspheric coefficients and parameters among the lens elements 1 to 8 are somewhat different, the object-side surface 21 of the second lens element 2 has a convex portion 214 in a vicinity of a periphery of the second lens element 2, the object-side surface 81 of the eighth lens element 8 has a convex portion 813 in a vicinity of the optical axis I, the object-side surface 61 of the sixth lens element 6 has a convex portion 614 in a vicinity of a periphery of the sixth lens element 6, and the image-side surface 62 of the sixth lens element 6 has a convex portion 625 in a vicinity of the optical axis I and a convex portion 626 in a vicinity of a periphery of the sixth lens element 6. It should be noted that in order to clearly display the figure, a part of the referential numbers of the concave portions and the convex portions that are the same as those of the fourth embodiment are omitted in FIG. 34.

Detailed optical data of the optical imaging lens 10 is shown in FIG. 34, and an effective focal length (EFL) of the whole system of the second embodiment is 2.360 mm, a half field of view (HFOV) thereof is 69.927°, an f-number (Fno) thereof is 2.442, and a system length thereof is 21.251 mm.

FIG. 37 illustrates various aspheric coefficients of the object-side surface 11 of the first lens element 1 to the image-side surface 62 of the sixth lens element 6 in the equation (1) in the eighth embodiment.

Moreover, relationships between various important parameters of the optical imaging lens 10 of the eighth embodiment are shown in FIG. 45.

According to the longitudinal spherical aberration diagram of FIG. 35A of the eighth embodiment, a deviation of the imaging points of the off-axis lights of different heights is controlled within a range of ±0.03 mm. According to the two field curvature aberration diagrams of FIG. 35B and FIG. 35C, a focal length variation of the three representative wavelengths in the whole field of view falls within ±0.20 mm. According to the distortion aberration diagram of FIG. 35D, a distortion aberration of the fourth embodiment is maintained within the range of ±100%. In the present embodiment, a focal shift of the optical imaging lens 10 is 0 mm at 20° C., and a focal shift of the optical imaging lens 10 is 0.004 mm at 50° C. Therefore, it is known that compared to the existing optical lens, the eighth embodiment may also achieve the good optical performance under a condition that the optical imaging lens has a good performance of athermalization.

According to the above description, it is learned that compared to the fourth embodiment, the advantages of the eighth embodiment are that the system length of the eighth embodiment is shorter than that of the fourth embodiment, the half field of view of the eighth embodiment is greater than that of the fourth embodiment, and the longitudinal spherical aberration of the eighth embodiment is smaller than that of the fourth embodiment.

FIG. 38 is a schematic diagram of an optical imaging lens according to an ninth embodiment of the invention, and FIG. 39A to FIG. 39D are diagrams illustrating a longitudinal spherical aberration and various aberrations of the optical imaging lens of the ninth embodiment. Referring to FIG. 38, which is an ninth embodiment of the optical imaging lens 10 of the invention, where the ninth embodiment is similar to the fourth embodiment, and only optical data, aspheric coefficients and parameters among the lens elements 1 to 8 are somewhat different, the object-side surface 21 of the second lens element 2 has a convex portion 214 in a vicinity of a periphery of the second lens element 2, the object-side surface 81 of the eight lens element 8 has a convex portion 813 in a vicinity of the optical axis I, the object-side surface 31 of the third lens element 3 has a convex portion 313 in a vicinity of a periphery of the third lens element 3, the image-side surface 52 of the fifth lens element 5 has a concave portion 524 in a vicinity of a periphery of the fifth lens element 5, and the object-side surface 61 of the sixth lens element 6 has a convex portion 614 in a vicinity of a periphery of the sixth lens element 6 and the image-side surface 62 of the sixth lens element 6 has a convex portion 625 in a vicinity of the optical axis I. It should be noted that in order to clearly display the figure, a part of the referential numbers of the concave portions and the convex portions that are the same as those of the fourth embodiment are omitted in FIG. 38.

Detailed optical data of the optical imaging lens 10 is shown in FIG. 40, and an effective focal length (EFL) of the whole system of the second embodiment is 2.370 mm, a half field of view (HFOV) thereof is 47.778°, an f-number (Fno) thereof is 2.538, and a system length thereof is 19.359 mm.

FIG. 41 illustrates various aspheric coefficients of the object-side surface 11 of the first lens element 1 to the image-side surface 62 of the sixth lens element 6 in the equation (1) in the ninth embodiment.

Moreover, relationships between various important parameters of the optical imaging lens 10 of the ninth embodiment are shown in FIG. 45.

According to the longitudinal spherical aberration diagram of FIG. 39A of the ninth embodiment, a deviation of the imaging points of the off-axis lights of different heights is controlled within a range of ±0.06 mm. According to the two field curvature aberration diagrams of FIG. 39B and FIG. 39C, a focal length variation of the three representative wavelengths in the whole field of view falls within ±0.08 mm. According to the distortion aberration diagram of FIG. 39D, a distortion aberration of the fourth embodiment is maintained within the range of ±100%. In the present embodiment, a focal shift of the optical imaging lens 10 is 0 mm at 20° C., and a focal shift of the optical imaging lens 10 is 0.007 mm at 50° C. Therefore, it is known that compared to the existing optical lens, the ninth embodiment may also achieve the good optical performance under a condition that the optical imaging lens has a good performance of athermalization.

According to the above description, it is learned that compared to the fourth embodiment, the advantages of the ninth embodiment are that the system length of the ninth embodiment is shorter than that of the fourth embodiment, and the half field of view of the ninth embodiment is greater than that of the fourth embodiment.

Referring to FIG. 42 to FIG. 45 are a table diagram of various optical parameters of the aforementioned nine embodiments, and when the various optical parameters in the optical imaging lens 10 of the invention are complied with at least one of the following conditional expressions, it assists a designer to design a technically feasible optical imaging lens with good optical performance and a good performance of athermalization.

Numerical ranges including the maximum and minimum values and values between the maximum and minimum values obtained by the ratio relationships from various combinations among the aforementioned optical parameters in the various embodiments of the present disclosure can all be implemented accordingly.

Based on the above, the optical imaging lens of at least one of the embodiments of the present invention may have at least one of the following effects and advantages:

1. A field of view of the whole optical system can be expanded by the collocation of the first lens element having negative refracting power, the convex portion in a vicinity of the optical axis of the object-side surface of the second lens element and the convex portion in a vicinity of the optical axis of the image-side surface of the third lens element.

2. The convex portion in a vicinity of the optical axis of the image-side surface of the fourth lens element, the convex portion in a vicinity of the optical axis of the image-side surface of the fifth lens element and the sixth lens element having positive refracting power benefit the correction of the aberrations.

3. The optical imaging lens satisfies:
2.4≤(G1+G2)/T6, and preferably 2.4≤(G1+G2)/T6≤24, wherein G1 refers to G12 in all embodiments, G2 is a distance between the image-side surface of the second lens element and an object-side surface, facing the object side, of a first lens having a refracting power and sequentially counted from the second lens element toward the image side on the optical axis (for example, G2 refers G23 in any one of the first embodiment and the second embodiment, or G2 refers G28 in any one of the third embodiment, the fourth embodiment, the fifth embodiment, the sixth embodiment, the seventh embodiment, the eighth embodiment and the ninth embodiment). The system length of the optical imaging lens can be shortened and the imaging quality of the optical imaging lens can be maintained by adjusting the thicknesses of the lens elements and the ratio of air gaps between the lens elements.

4. The weight and the cost can be reduced by using plastics to manufacturing the lens elements. For the consideration of a performance of athermalization of the optical imaging lens of the present invention, at least one lens element adjacent to the aperture stop has a positive refracting power, and is a glass material.

5. In order to shorten the system length of the optical imaging lens and maintained the imaging quality of the optical imaging lens, the embodiments of the invention suitably shorten a thickness of the lens elements and the air gaps among the lens elements, though considering a difficulty level of an assembling process of the lens elements and under the premise that the imaging quality has to be ensured, the thickness of the lens elements and the air gaps among the lens elements have to be suitably adjusted, so that under value limitations of satisfying the following conditional expressions, the optical imaging system may achieve better configuration:

$2.40 \leq (G1+G2)/T6$, and preferably $2.40 \leq (G1+G2)/T6 \leq 24.0$;

$2.60 \leq (T1+T6)/T2$, and preferably $2.60 \leq (T1+T6)/T2 \leq 10.0$;

$4.50 \leq (G1+G2)/T2$, and preferably $4.50 \leq (G1+G2)/T2 \leq 35.80$;

$3.80 \leq AAG/T6$, and preferably $3.80 \leq AAG/T6 \leq 32.20$;

$4.40 \leq AAG/(T1+T2)$, and preferably $4.40 \leq AAG/(T1+T2) \leq 8.70$;

$AAG/(T1+G2) \leq 3.80$, and preferably $1.60 \leq AAG/(T1+G2) \leq 3.80$;

$BFL/(T2+G1) \leq 5.80$, and preferably $0.60 \leq BFL/(T2+G1) \leq 5.80$;

$ALT/G2 \leq 5.10$, and preferably $0.70 \leq ALT/G2 \leq 5.10$;

$ALT/(T1+G2) \leq 4.70$, and preferably $0.50 \leq ALT/(T1+G2) \leq 4.70$;

$ALT/(T2+G2) \leq 4.00$, and preferably $0.60 \leq ALT/(T2+G2) \leq 4.00$;

$TL/T1 \leq 18.60$, and preferably $12.0 \leq TL/T1 \leq 18.60$;

$TL/G1 \leq 18.30$, and preferably $4.40 \leq TL/G1 \leq 8.30$;

$5.40 \leq TL/(T1+T6)$, and preferably $5.40 \leq TL/(T1+T6) \leq 10.70$;

$TL/(T1+G1) \leq 7.80$, and preferably $3.30 \leq TL/(T1+G1) \leq 7.80$;

$TL/(T6+G2) \leq 5.90$, and preferably $2.50 \leq TL/(T6+G2) \leq 5.90$;

$BFL/T1 \leq 6.40$, and preferably $1.30 \leq BFL/T1 \leq 6.40$;

$BFL/G2 \leq 4.00$, and preferably $0.30 \leq BFL/G2 \leq 4.00$.

In order to avoid that the optical imaging lens is hard to manufacture or the system length is overly long, ratios of the system length to optical parameters are maintained in a suitable range.

$TTL/(G1+G2) \leq 5.60$, and preferably $2.20 \leq TTL/(G1+G2) \leq 5.60$;

$6.70 \leq TTL/(T2+T6)$, and preferably $6.70 \leq TTL/(T2+T6) \leq 32.5$;

$4.30 \leq TTL/(T6+G1)$, and preferably $4.30 \leq TTL/(T6+G1) \leq 7.70$.

However, due to unpredictability of optical system design, under the architectures of the embodiments of the invention, to comply with the aforementioned conditional expressions may effectively shorten the lens length of the optical imaging lens according to the embodiments of the invention, enlarge the applicable aperture thereof, increase the FOV thereof, enhance the imaging quality thereof or the assembling yield thereof to mitigate the disadvantages of the prior art.

The aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional convex portion in the vicinity of the optical axis on the eye-side surface of the first lens element. It should be noted that the above-described details can be optionally combined and applied to the other embodiments of the invention under the condition where they are not in conflict with one another.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical imaging lens, at least comprising:
   a first lens element, a second lens element, a third lens element, a fourth lens element, a fifth lens element and a sixth lens element arranged in a sequence from an object side to an image side along an optical axis, wherein each of the first lens element to the sixth lens element has an object-side surface facing the object side and pervious to imaging rays and an image-side surface facing the image side and pervious to the imaging rays;
   wherein the first lens element is arranged to be a lens element having refracting power in a first order from the object side to the image side and has a negative refracting power;
   the second lens element is arranged to be a lens element having refracting power in a second order from the object side to the image side and the object-side surface of the second lens element has a convex portion in a vicinity of the optical axis;
   the third lens element is a first lens having a refracting power and sequentially counted from an aperture stop toward the object side, and the image-side surface of the third lens element has a convex portion in a vicinity of the optical axis;
   the fourth lens element is a first lens having a refracting power and sequentially counted from an aperture stop toward the image side, and the image-side surface of the fourth lens element has a convex portion in a vicinity of the optical axis;
   the fifth lens element is a second lens having a refracting power and sequentially counted from the image side toward the object side, the image-side surface of the fifth lens element has a convex portion in a vicinity of the optical axis, and the object side surface of the fifth lens element has a convex portion in a vicinity of a periphery of the fifth lens element;
   the sixth lens element is a first lens having a refracting power and sequentially counted from the image side toward the object side, and the sixth lens element has a positive refracting power;
   at least one of the third lens element and the fourth lens element has a positive refracting power and is a glass material;
   the optical imaging lens is complied with:
   $2.4 \leq (G1+G2)/T6$;
   wherein G1 is a distance between the image-side surface of the first lens element and the object-side surface of the second lens element on the optical axis, G2 is a distance between the image-side surface of the second lens element and an object-side surface, facing the object side, of a first lens having a refracting power and sequentially counted from the second lens element toward the image side on the optical axis, and T6 is a thickness of the sixth lens element on the optical axis;
   $TL/T1 \leq 18.6$, wherein TL is a distance between the object-side surface of the first lens element and the image-side surface of the sixth lens element on the optical axis, and T1 is a thickness of the first lens element on the optical axis.

2. The optical imaging lens as claimed in claim 1, wherein the optical imaging lens is further complied with:
   $2.6 \leq (T1+T6)/T2$, wherein T2 is a thickness of the second lens element on the optical axis.

3. The optical imaging lens as claimed in claim 1, wherein the optical imaging lens is further complied with:
   $4.5 \leq (G1+G2)/T2$, wherein T2 is a thickness of the second lens element on the optical axis.

4. The optical imaging lens as claimed in claim 1, wherein the optical imaging lens is further complied with:
   $TTL/(G1+G2) \leq 5.6$, wherein TTL is a distance from the object-side surface of the first lens element to an image plane of the optical imaging lens on the optical axis.

5. The optical imaging lens as claimed in claim 1, wherein the optical imaging lens is further complied with:
   $6.7 \leq TTL/(T2+T6)$, wherein TTL is a distance from the object-side surface of the first lens element to an image plane of the optical imaging lens on the optical axis, and T2 is a thickness of the second lens element on the optical axis.

6. The optical imaging lens as claimed in claim 1, wherein the optical imaging lens is further complied with:
   $4.3 \leq TTL/(T6+G1)$, wherein TTL is a distance from the object-side surface of the first lens element to an image plane of the optical imaging lens on the optical axis.

7. The optical imaging lens as claimed in claim 1, wherein the optical imaging lens is further complied with:

3.8≤AAG/T6, wherein AAG is a sum of air gaps between the first lens element and the sixth lens element on the optical axis.

8. The optical imaging lens as claimed in claim 1, wherein the optical imaging lens is further complied with:
4.4≤AAG/(T1+T2), wherein AAG is a sum of air gaps between the first lens element and the sixth lens element on the optical axis, and T2 is a thickness of the second lens element on the optical axis.

9. The optical imaging lens as claimed in claim 1, wherein the optical imaging lens is further complied with:
AAG/(T1+G2)≤3.8, wherein AAG is a sum of air gaps between the first lens element and the sixth lens element on the optical axis.

10. The optical imaging lens as claimed in claim 1, wherein the optical imaging lens is further complied with:
BFL/(T2+G1)≤5.8, wherein BFL is a distance between the image-side surface of the sixth lens element and an image plane of the optical imaging lens on the optical axis, and T2 is a thickness of the second lens element on the optical axis.

11. The optical imaging lens as claimed in claim 1, wherein the optical imaging lens is further complied with:
ALT/G2≤5.1, wherein ALT is a sum of center thicknesses of all lens elements between the object side and the image side on the optical axis.

12. The optical imaging lens as claimed in claim 1, wherein the optical imaging lens is further complied with:
ALT/(T1+G2)≤4.7, wherein ALT is a sum of center thicknesses of all lens elements between the object side and the image side on the optical axis.

13. The optical imaging lens as claimed in claim 1, wherein the optical imaging lens is further complied with:
ALT/(T2+G2)≤4.0, wherein ALT is a sum of center thicknesses of all lens elements between the object side and the image side on the optical axis, and T2 is a thickness of the second lens element on the optical axis.

14. The optical imaging lens as claimed in claim 1, wherein the optical imaging lens is further complied with:
TL/G1≤8.3.

15. The optical imaging lens as claimed in claim 1, wherein the optical imaging lens is further complied with:
5.4≤TL/(T1+T6).

16. The optical imaging lens as claimed in claim 1, wherein the optical imaging lens is further complied with:
TL/(T1+G1)≤7.8.

17. The optical imaging lens as claimed in claim 1, wherein the optical imaging lens is further complied with:
TL/(T6+G2)≤5.9.

18. The optical imaging lens as claimed in claim 1, wherein the optical imaging lens is further complied with:
BFL/T1≤6.4, wherein BFL is a distance between the image-side surface of the sixth lens element and an image plane of the optical imaging lens on the optical axis.

19. The optical imaging lens as claimed in claim 1, wherein the optical imaging lens is further complied with:
BFL/G2≤4.0, wherein BFL is a distance between the image-side surface of the sixth lens element and an image plane of the optical imaging lens on the optical axis.

* * * * *